(12) United States Patent
Pope et al.

(10) Patent No.: US 8,094,875 B1
(45) Date of Patent: Jan. 10, 2012

(54) PERFORMING OPTICAL RECOGNITION ON A PICTURE OF A REMOTE TO IDENTIFY AN ASSOCIATED CODESET

(75) Inventors: Steven M. Pope, Los Gatos, CA (US); Raymond O. Chock, San Jose, CA (US); Norman G. Sheridan, Fremont, CA (US)

(73) Assignee: UEI Cayman Inc., Cypress, CA (US)

( * ) Notice: Subject to any disclaimer, the term of this patent is extended or adjusted under 35 U.S.C. 154(b) by 936 days.

(21) Appl. No.: 12/148,475

(22) Filed: Apr. 18, 2008

(51) Int. Cl.
*G06K 9/00* (2006.01)
*H04H 20/71* (2008.01)
*H04B 1/02* (2006.01)
*H04B 1/06* (2006.01)

(52) U.S. Cl. .......... 382/100; 455/3.03; 455/92; 455/352

(58) Field of Classification Search .................. 382/100; 455/92, 352, 3.03
See application file for complete search history.

(56) References Cited

U.S. PATENT DOCUMENTS

| | | | |
|---|---|---|---|
| 4,623,887 A | 11/1986 | Welles, II | |
| 4,774,511 A | 9/1988 | Rumbolt et al. | |
| 4,959,810 A | 9/1990 | Darbee et al. | |
| 5,263,098 A | 11/1993 | Horikami | |
| 5,406,384 A * | 4/1995 | Sakuragi | 358/403 |
| 5,481,256 A | 1/1996 | Darbee et al. | |
| 5,515,052 A | 5/1996 | Darbee | |
| 5,959,751 A | 9/1999 | Darbee et al. | |
| 6,014,092 A | 1/2000 | Darbee et al. | |
| 6,115,495 A | 9/2000 | Tachikawa et al. | |
| 6,157,319 A | 12/2000 | Johns et al. | |
| 6,211,856 B1 | 4/2001 | Choi et al. | |
| 6,211,870 B1 | 4/2001 | Foster | |
| 6,225,938 B1 | 5/2001 | Hayes et al. | |
| 6,377,262 B1 * | 4/2002 | Hitchcock et al. | 345/467 |
| 6,763,148 B1 | 7/2004 | Sternberg et al. | |
| 6,952,496 B2 | 10/2005 | Krumm | |
| 7,046,161 B2 | 5/2006 | Hayes | |
| 7,479,903 B2 * | 1/2009 | Otsuka et al. | 341/22 |
| 7,542,072 B2 * | 6/2009 | DeMenthon | 348/207.99 |
| 7,792,678 B2 * | 9/2010 | Hung | 704/275 |
| 2001/0017615 A1 | 8/2001 | Lin et al. | |
| 2001/0045819 A1 | 11/2001 | Harris et al. | |

(Continued)

FOREIGN PATENT DOCUMENTS

EP 1578016 A1 9/2005

(Continued)

*Primary Examiner* — Andrew W Johns
*Assistant Examiner* — Shefali Goradia
(74) *Attorney, Agent, or Firm* — Greenberg Traurig, LLP

(57) ABSTRACT

A home entertainment device eliminates the need to use multiple remotes. The device is connected (by wired and/or wireless links) to electronic consumer devices (ECDs) to be controlled. A user uses a portable display device to view pages served by the device, and thereby to communicate with the device and indirectly control the ECDs. In a first aspect, a HDMI-CEC communication is used to identify a codeset from a codeset database. In a second aspect, the codeset of a remote is identified by serving pictures of remotes to the user. The user selects a picture and the system looks up its codeset. In a third aspect, keys on an illustration of a remote are dragged and dropped to create a new custom remote. In a fourth aspect, the user supplies a digital photograph of a remote. The system performs optical recognition and identifies the type of remote and its codeset.

5 Claims, 32 Drawing Sheets

U.S. PATENT DOCUMENTS

| Publication | Date | Inventor | Citation |
|---|---|---|---|
| 2002/0143805 A1 | 10/2002 | Hayes et al. | |
| 2003/0025840 A1 | 2/2003 | Arling | |
| 2003/0095156 A1 | 5/2003 | Klein et al. | |
| 2003/0103088 A1 | 6/2003 | Dresti et al. | |
| 2003/0141987 A1 | 7/2003 | Hayes | |
| 2003/0189509 A1 | 10/2003 | Hayes et al. | |
| 2004/0003001 A1 | 1/2004 | Shimura | |
| 2004/0070491 A1 | 4/2004 | Huang et al. | |
| 2004/0257259 A1 | 12/2004 | Jindal | |
| 2005/0054289 A1 | 3/2005 | Salazar et al. | |
| 2006/0050142 A1 | 3/2006 | Scott et al. | |
| 2006/0227997 A1 | 10/2006 | Au et al. | |
| 2007/0038516 A1* | 2/2007 | Apple et al. | 705/14 |
| 2007/0051591 A1* | 3/2007 | Otsuka et al. | 200/5 A |
| 2007/0080845 A1 | 4/2007 | Amand | |
| 2007/0096283 A1 | 5/2007 | Ljung et al. | |
| 2007/0217650 A1 | 9/2007 | Ota et al. | |
| 2007/0285284 A1* | 12/2007 | Matteo et al. | 341/22 |
| 2007/0296604 A1* | 12/2007 | Koyata | 340/825.22 |
| 2008/0101723 A1* | 5/2008 | Kansal | 382/284 |
| 2008/0219543 A1* | 9/2008 | Csulits et al. | 382/135 |
| 2008/0284566 A1* | 11/2008 | Zai et al. | 340/7.56 |
| 2008/0305856 A1* | 12/2008 | Walker et al. | 463/25 |

FOREIGN PATENT DOCUMENTS

| | | |
|---|---|---|
| WO | 2005/043484 | 5/2005 |
| WO | WO 2008101299 A1 * | 8/2008 |

* cited by examiner

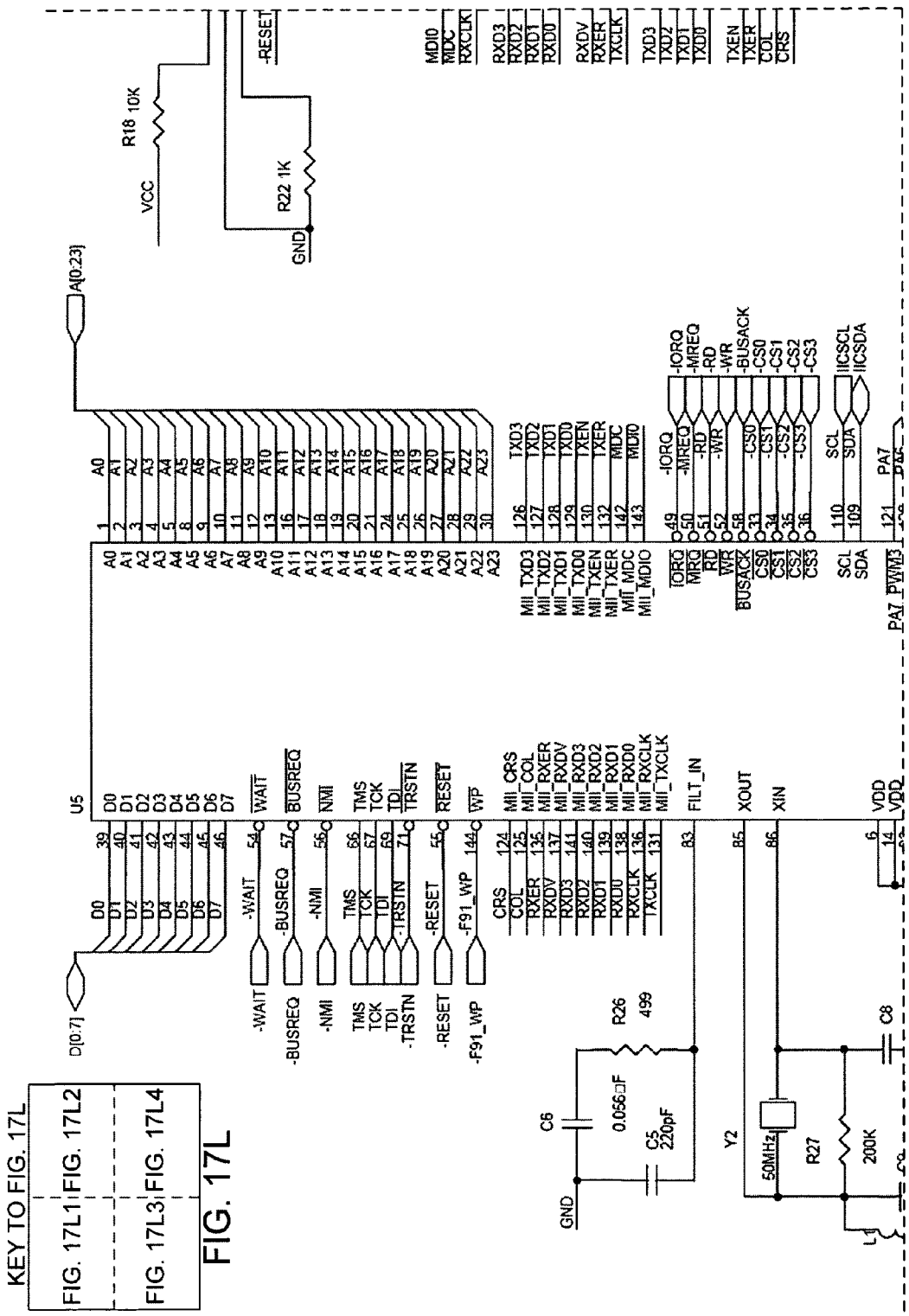

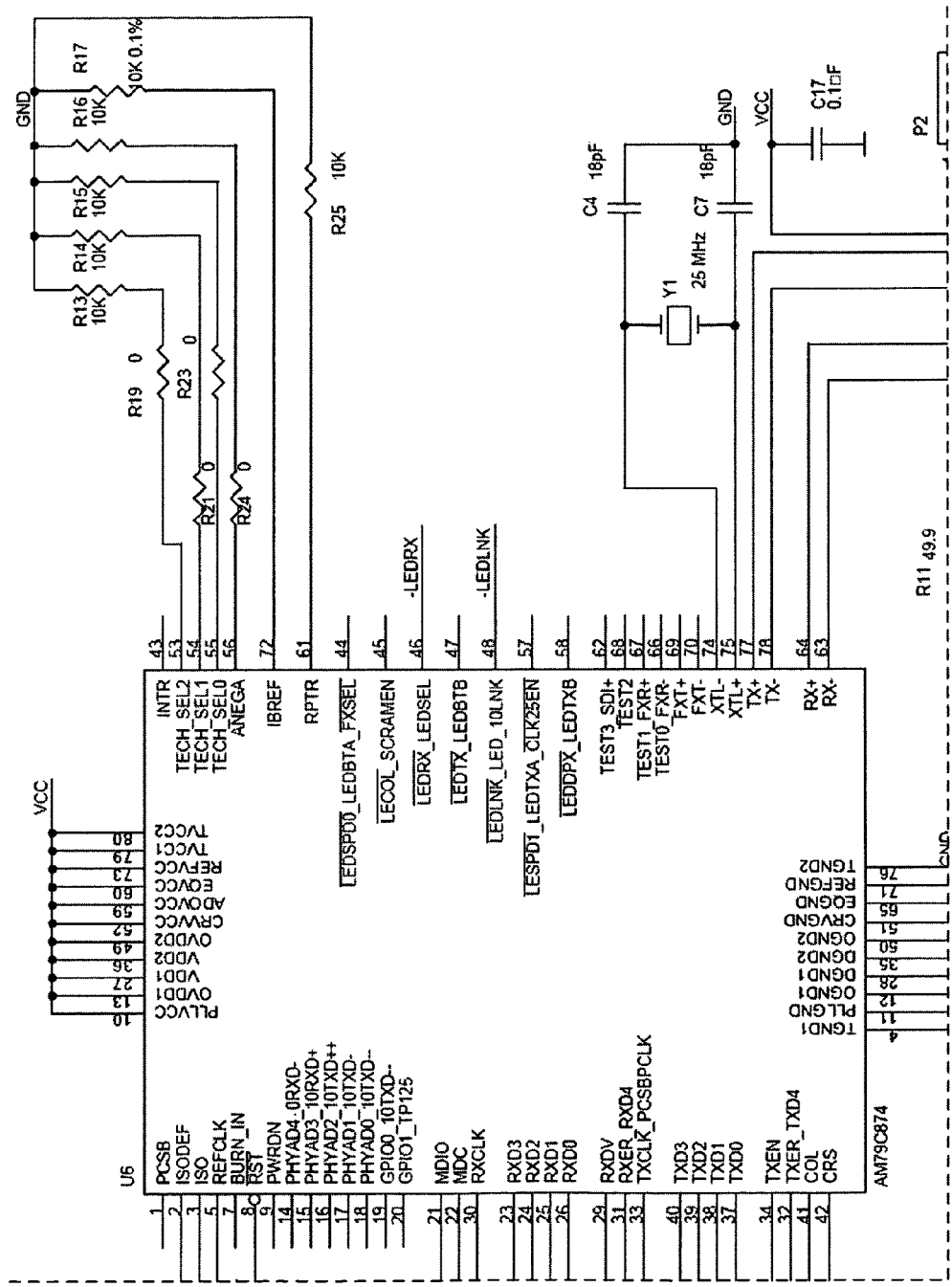
FIG. 17L2

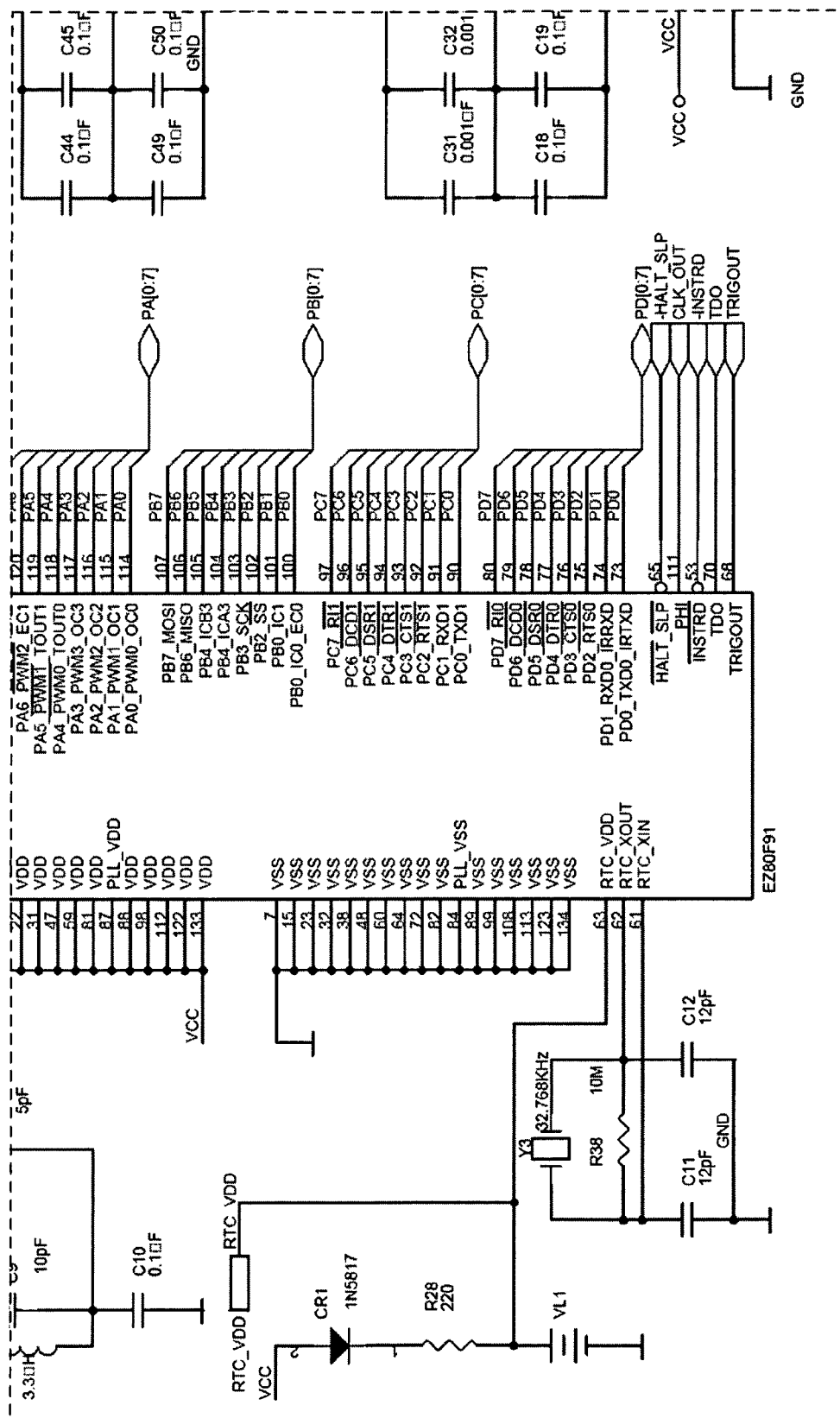
FIG. 17L3

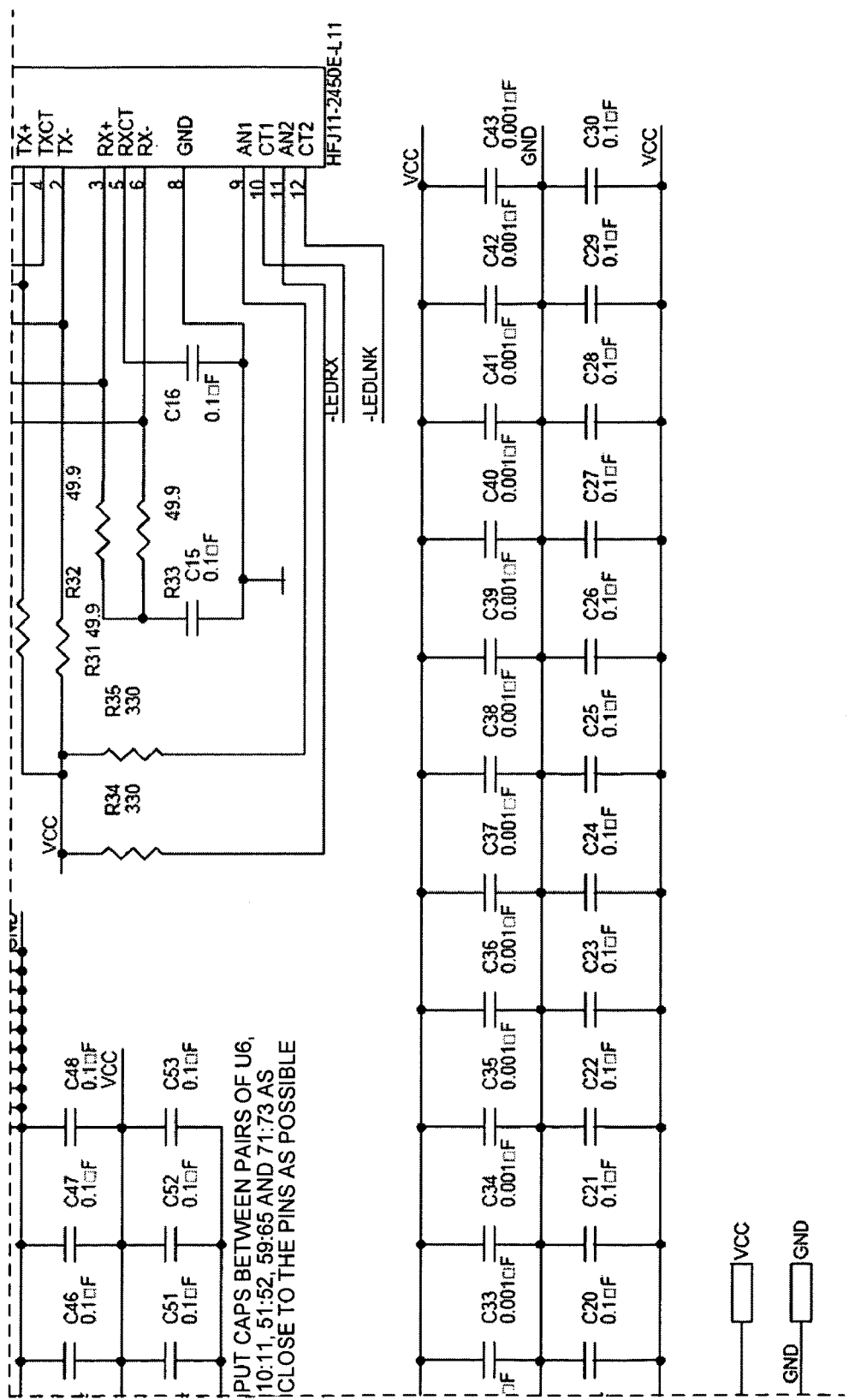
FIG. 17L4

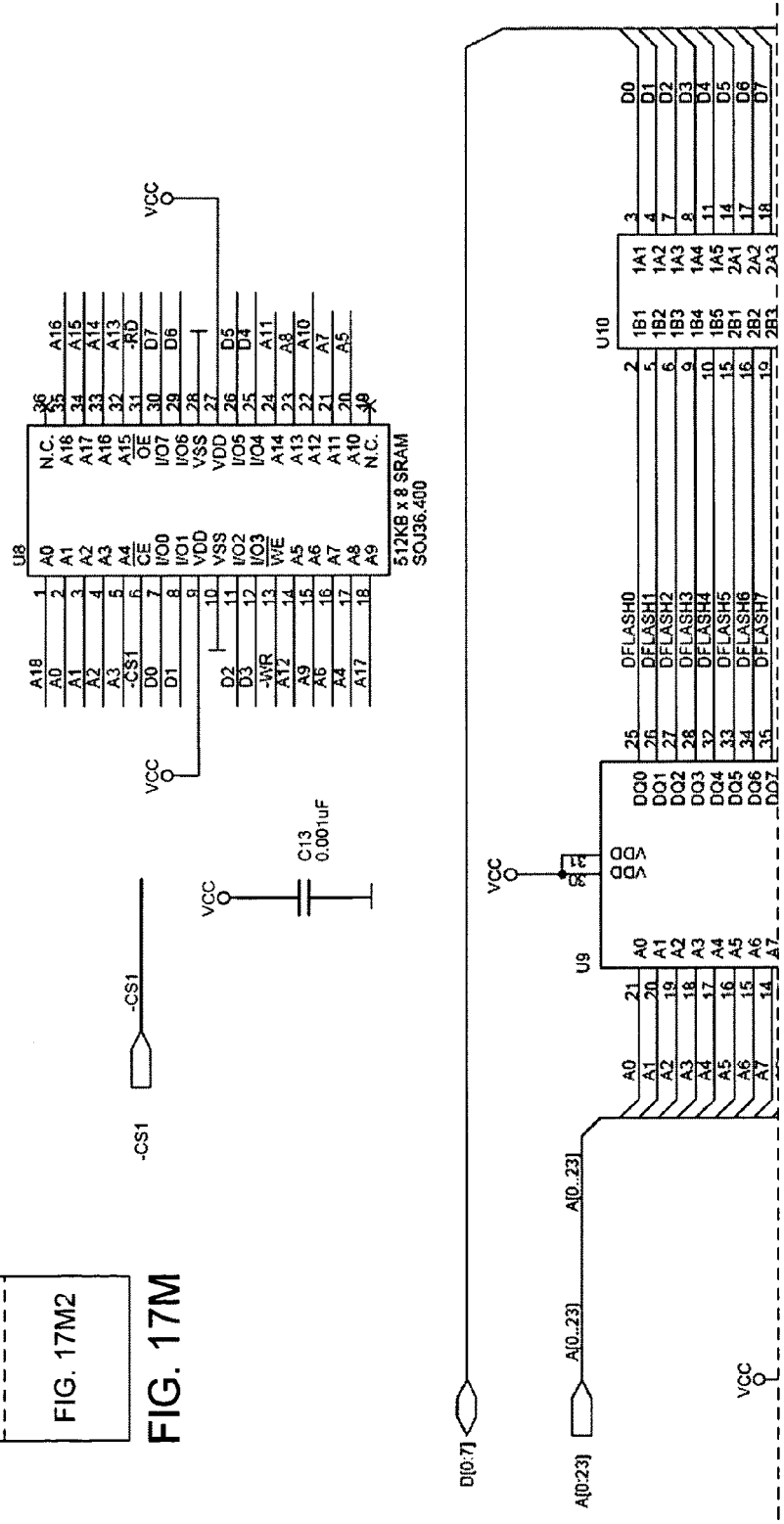

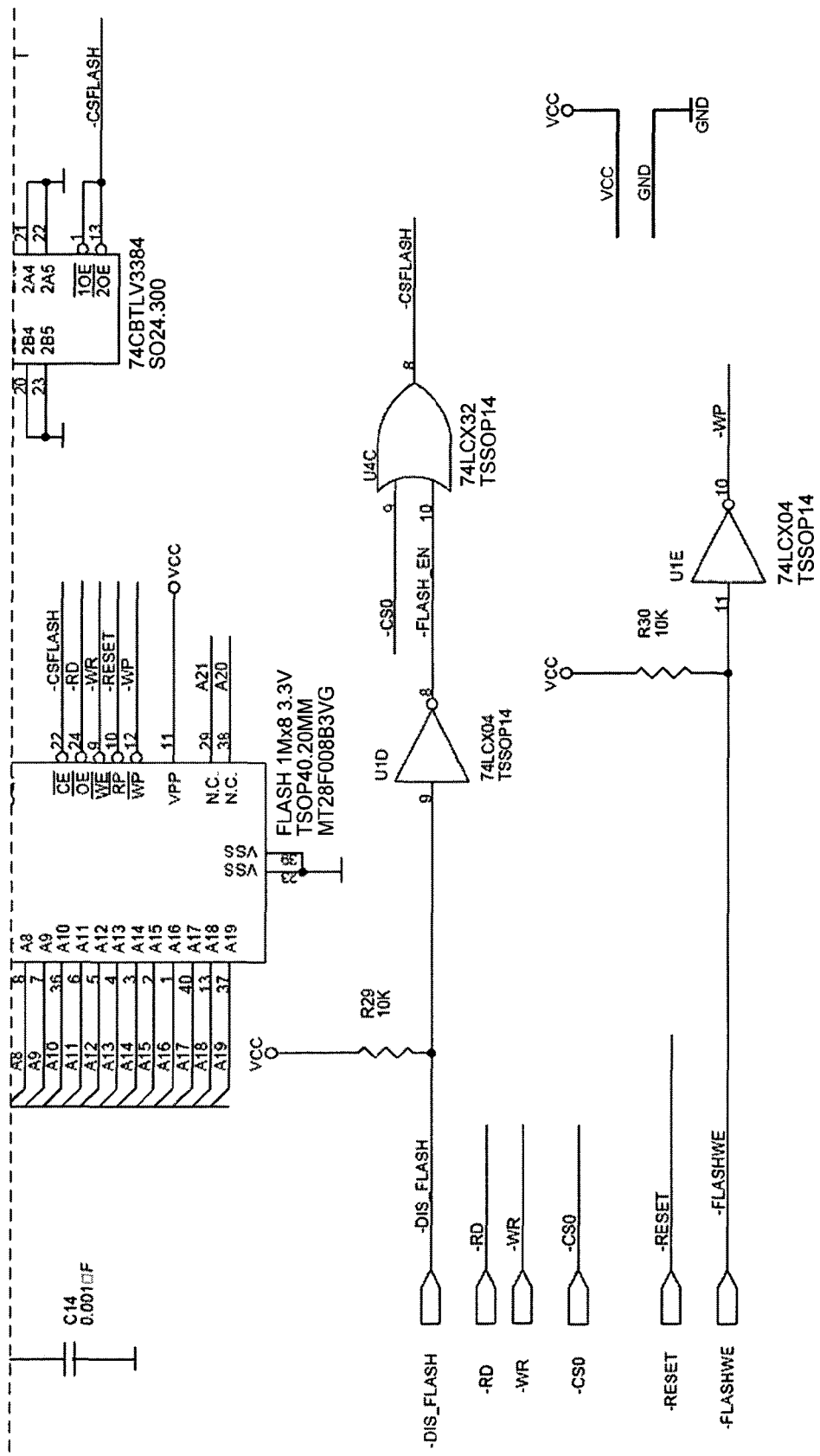
FIG. 17M2

US 8,094,875 B1

PERFORMING OPTICAL RECOGNITION ON A PICTURE OF A REMOTE TO IDENTIFY AN ASSOCIATED CODESET

TECHNICAL FIELD

This application relates to systems including control devices for performing methods for control of electronic consumer devices.

BACKGROUND INFORMATION

Consumers purchase many electronic devices for their homes. One device might be a television. The television comes with a remote control, which has various functions, such as on off; channel up and down; volume up and down; and so on. The remote control communicates with the television via an infrared signal. Another electronic consumer device is a DVD player. The DVD player likewise comes with its own remote control with its own shape, button layout, button functions, and text and other characters on the remote. The same can be said for an audiovisual receiver, a cable box, and a game console. Some of these devices may be connected together. For example, the game console can output a video signal that is connected to the audiovisual receiver via S-video. The same can be said for the DVD player. Other methods of connecting devices can also be used. For example, a cable box may be connected to the audiovisual receiver using a High Definition Multimedia Interface (HDMI) cable. The net result of all of this is that the consumer must have anywhere from two to five or more remote controls, each one being needed to control its respective associated electronic consumer device (ECD). Not only does this make for a lot of clutter in the consumer's home, but it also is confusing to remember which remote goes with which device, and which of the many multitudes of possible choices on each remote the consumer is most interested in.

A more detailed example 20 is shown in FIG. 1. One remote 31, with its own unique button layout, is used to control a television 21. Another remote 32 is used to control an audiovisual receiver 22. Another remote 34 is used to control a game console 24, and another remote 36 is used to control a cable box 26. Lastly, another remote 38 is used to control a DVD player 28. Each remote has its own unique button layout, as illustrated schematically in FIG. 1.

SUMMARY

The system of the preferred embodiment eliminates the need to use multiple remote control devices on a regular basis. Instead of needing a multitude of different remote controls, a single browser device (for example, a cellular telephone having a display) can be used. The browser device can illustrate all of the various remotes currently used by the consumer, only one at a time. The illustrated remotes each function in the same manner as the original remotes. By using the browser device, the clutter and the need to keep and locate a number of different remotes is eliminated.

In one embodiment, the browser device communicates via Wi-Fi with a central function device. The function device has information regarding all the various remote controls needed by the consumer. The function device communicates wirelessly with the browser device and in turn then operates all of the consumer's electronic devices.

In a first novel aspect, the single-line HDMI-CEC (High Definition Multimedia Interface-Consumer Electronic Control) bus or protocol is used to identify an IR codeset for an electronic consumer device (ECD) from a database of IR codesets. When the ECD is coupled to an AV system via an HDMI cable, the system automatically queries the new ECD using the single-wire HDMI-CEC bus to identify itself. The ECD automatically responds by sending back information across the HDMI-CEC bus. This information is usable to identify the ECD. In one example, the returned information includes a brand name in ACSII format of the ECD, a device type in ASCII format of the ECD, and a model number in ASCII format of the ECD. The system uses the returned information to identify particular IR codeset in the database that is usable to control the ECD. The system then enables an IR remote control device to use the identified codeset to send IR remote control operational signals to the ECD device so that the IR remote control device can control the ECD. The use of HDMI-CEC to identify a codeset is not, however, limited to IR applications but rather also applies to codesets used to generate and detect other wireless remote control operational signals such as, for example, RF remote control operational signals for remote control devices that transmit RF signals.

In a second novel aspect, illustrations (for example, digital pictures) of a plurality of remote control devices are displayed to a user on a portable display device. The user then uses the portable display device to select one of the illustrations that looks like a remote control device that the user is trying to imitate. When the user selects the illustration, the system uses the user selection to identify an IR codeset for the associated ECD from many IR codesets in a database of IR codesets. In one example, a portable display device such as a PDA, or cellular telephone, or Apple iPhone having a browser communicates with an AV system. The AV system serves the illustrations of the remote control devices, and the portable display device and associated browser displays the illustrations to the user. The user then uses the portable display device and browser to select the illustration of the remote control device that the user wishes to emulate. Alternatively, the portable display device displays illustrations or pictures of ECDs and the user might want to control. The user uses the portable display device to select the picture of the ECD that the user wishes to control. In either case, the portable display device communicates the user selection information back to the system. The system uses the information to identify the IR codeset in the database that controls the ECD (the ECD controlled by the remote control device). In one example, the system then enables the portable display device to use the identified codeset to send IR remote control operational signals to the ECD device so that the portable display device can operate as (imitate) the original remote control device picture selected by the user. By showing the user pictures of ECDs that the user might want to control, the system is usable to emulate a remote control device that the user has lost.

In a third novel aspect, pictures of a' plurality of remote control devices are displayed to a user on a portable display device. The user can use the portable display device to select icons or buttons on the pictures, and to cause functionality of the selected icons or buttons to be associated with another rendering of a remote control device. For example, the user can copy (for example, by "dragging and dropping") a selected icon or key or button from the pictured remote control device to a template of a remote control device illustrated elsewhere on the portable display device. Both the pictured remote control device and the template remote control device are displayed on the portable display device. As the user "drags and drops" icons or keys or buttons, the icons or keys or buttons are added to and appear on the template. In this way, icons or keys or buttons from multiple different pictured remote control devices can be dragged and dropped onto the same template, and the functionalities associated with the original icons, key and buttons in the pictured remote control devices are automatically assumed by the associated new icons or keys or buttons on the template. Using this feature, the user builds a new custom hybrid remote control device, a rendering of which can be displayed on the portable display device. When the user later selects an icon or key or button on the hybrid remote control device, the portable display device performs the function that the original pictured remote control device that had the same key would have performed.

In a fourth novel aspect, the user takes a digital picture of a remote control device to be imitated, and this picture is communicated to a system. The system performs optical recognition on the digital picture. In one example, a user has a portable display device such as a PDA, or cellular telephone, or Apple iPhone that has a camera functionality. The user uses the portable display device to take a digital picture of an IR remote control device. The display device then communicates the digital picture (for example, in the form of a JPEG file) to the system. The system performs optical object recognition on the digital picture and identifies which one of a plurality of codesets in a database of codeset is the codeset for the remote control device in the digital picture. The database may, for example, contain information on what the various remote control device look like so that the optical recognition results will be usable to identify the pictured remote control device. This information may include information on the shape of the contour of the remote control device, the number of keys and placement of keys on the remote control device, and text that is printed on the remote control device. Once the system has identified the codeset associated with the pictured remote control device, the system communicates back to the portable display device such that the portable display device is enabled to use the identified codeset to send IR remote control operational signals in accordance with the codeset. In this way, a user may use the portable display device to take a picture of a remote control device that operates a particular. ECD. The system then responds by enabling the portable display device to emulate the remote control device. A picture or rendering of the emulated remote control device may thereafter be displayed on the portable display device. When the selects an icon or key or button on this picture or rendering, the portable display device performs the same function that the original remote control device would have performed.

In another example, the internet-accessible computer system receives from a user a digital image of an electrical device via the internet. The electrical device may, for example, be a remote control device or an electronic consumer device (ECD) that is controlled by a remote control device. The internet-accessible computer system then automatically performs optical object recognition on the digital image, and charges the user a fee to return information obtained from the optical recognition. The returned information may, for example, be codeset information.

Further details and embodiments are described in the detailed description below. This summary does not purport to define the invention. The invention is defined by the claims.

BRIEF DESCRIPTION OF THE DRAWINGS

The accompanying drawings, where like numerals indicate like components, illustrate various embodiments.

FIG. 11 is an illustration of a method of using a digital image to narrow down the possible choices of which particular device for consumers interested in.

FIGS. 17A through 17K, 17L, 17L1 through 17L4, 17M, 17M1, and 17M2 illustrate the details of the components that make up the function device shown in FIG. 17.

DETAILED DESCRIPTION

The drawings illustrate a system for controlling electronic consumer devices (ECDs). Household ECDs, as used in this description, can be anything that can be controlled by a remote control device or a keypad or some other control device, such as a DVD, a television, an audiovisual receiver, a sprinkler system, a light switch, an alarm panel, a game console, a computer, and so on.

Overview

Figure 1:
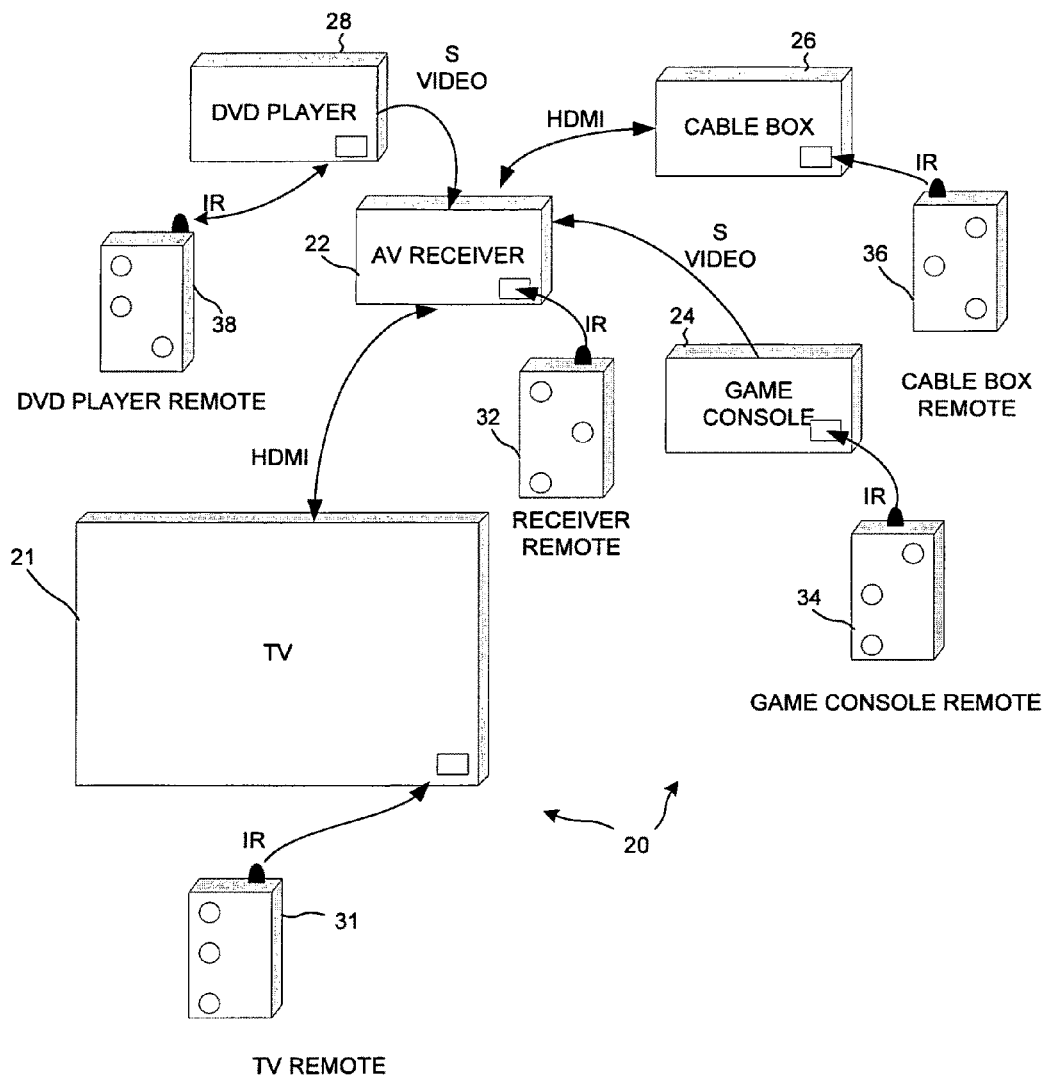
FIG. 1 is a diagram of a collection of various electronic consumer devices, including various means of communication.
Figure 2:
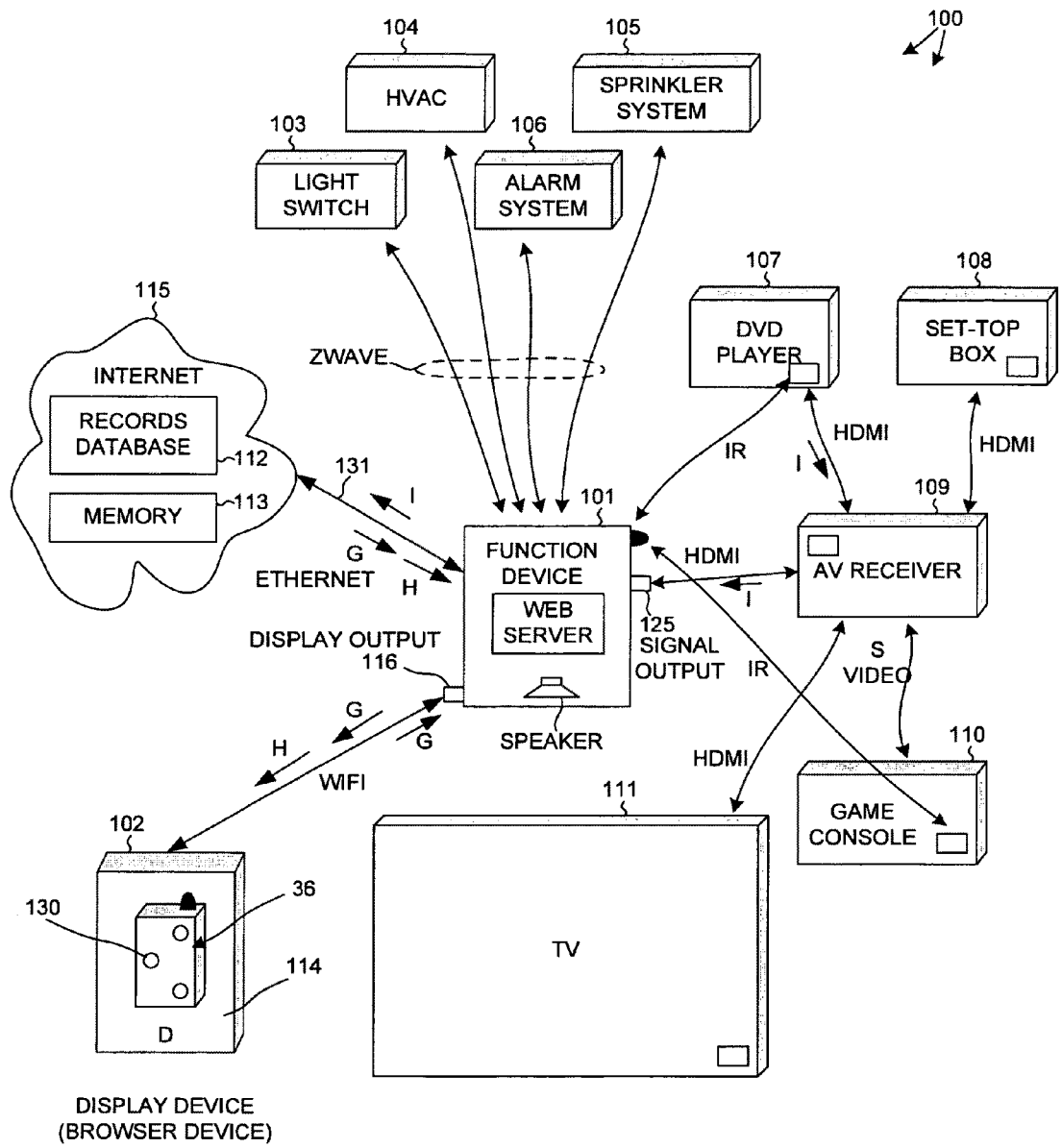
FIG. 2 is a schematic illustration of a system for communicating with electronic consumer devices.

FIG. 2 is one embodiment of a system 100 for controlling electronic consumer devices (ECDs). System 100 includes a function device 101, a display 102, a plurality of ECDs 103-111, a database 112 and a memory 113. Database 112 and memory 113 are accessible via a network connection 131 to a network such as the internet 115. The ECDs 103-111 include, in this example, a light switch 103, a heating ventilation and air conditioning (HVAC) controller 104, sprinkler system controller 105, an alarm system controller 106, a DVD player 107, a set-top box 108, an audio-visual receiver 104 (sometimes also referred to as an "audio-video receiver" or "AV receiver"), a game console 110, and a television 111. In other embodiments, more or fewer ECDs may be present.

Function device 101 communicates with the database 112. In one example, the database 112 is a database of codesets. For details on an example of a codeset and what a codeset entails and how a codeset is used, see: U.S. Pat. No. 7,259,696, the subject matter of which is incorporated herein by reference. Database 112 includes information on the identities of many different types of ECDs, and information on the functions of each ECD. These functions may, for example, be volume up or down, channel up or down, turn on sprinkler, etc., which can be controlled by a remote control device. The ECD manufacturer usually supplies such a remote control device at the time the ECD is originally sold to consumers. How to generate the various signals needed to be received by the ECD in order to make the ECD perform a desired function is set forth in database 112.

In a further example, database 112 is or includes a pictorial record database of illustrations of remotes or control devices with buttons that are used to control the ECD functions. The term "illustration" as it is used here includes both digital photographs and schematic renderings. The term "control device" as it is used here encompasses, but is not limited to, a remote control device.

In a further example, in addition to an illustration of the control device, database 112 includes extracted graphical information on each control device. Such extracted graphical information may, for example, include information on the shape of the control device, the buttons (keys) on the control device, the number of buttons and the locations of the buttons, and characters or other printing that appears on the control device. The database also includes the ECD function information (keycodes and other codeset information) associated with each button.

Central function device 101 communicates with the database 112 to obtain the control device's information, such as the devices shape, devices button labels, button shapes, and the button locations i.e., the button layout. Function device 101 also includes a display output 116 that outputs a signal to a display device 102. Display device 102 displays an input screen that illustrates the control device's information, such as the device's shape, button labels, button shapes and button locations or layout.

Figure 2A:
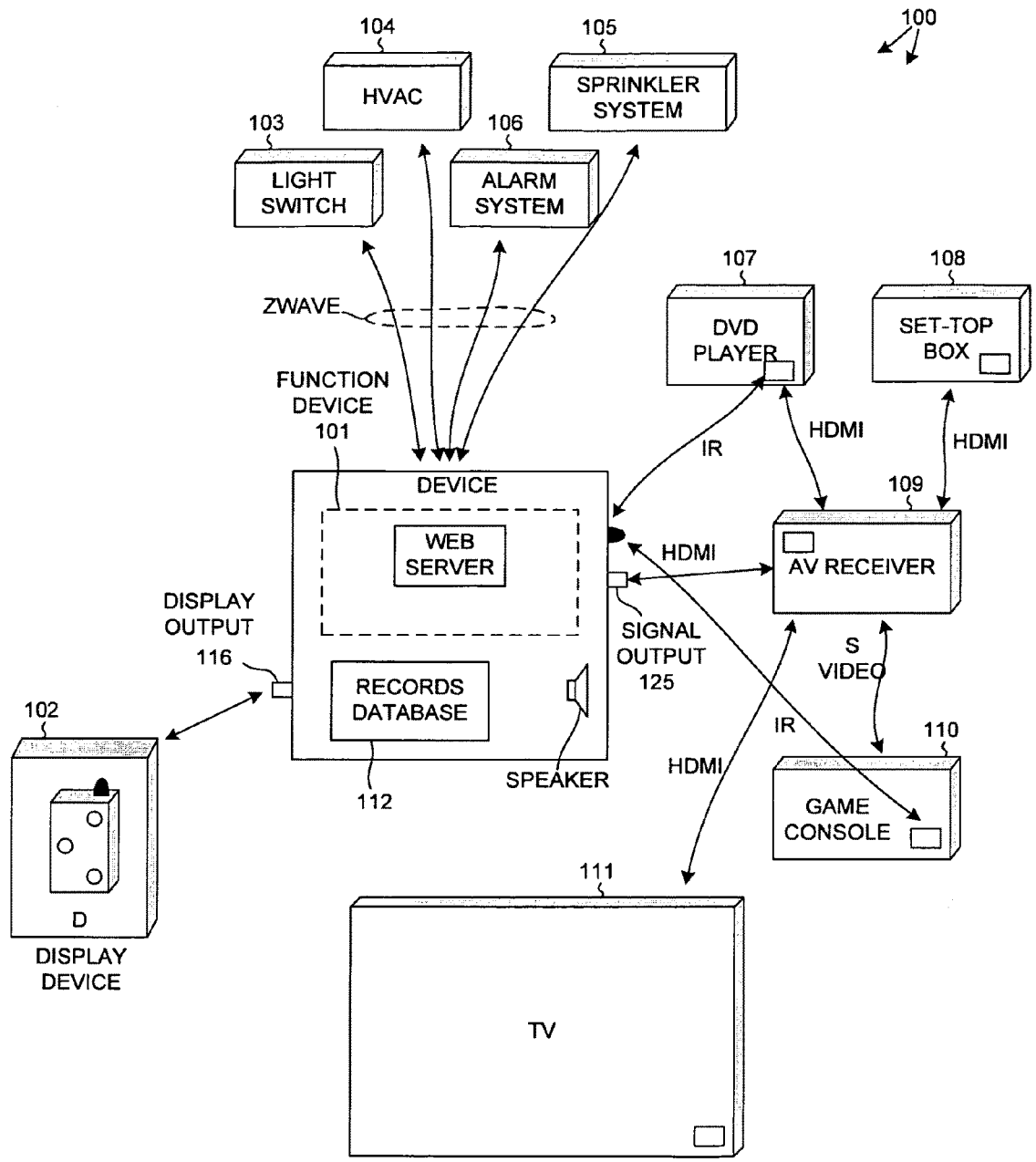
FIG. 2A is a, schematic illustration of a system for communicating with electronic consumer devices, where a device includes among other parts: the functionality of the function device of FIG. 2, the records database of FIG. 2, a speaker, a display output, and a signal output 125.

Although function device 101, database 112, memory 113 and display device 102 are illustrated in FIG. 2 as separate devices or functionalities, in another embodiment (see FIG. 2A) some or all of these system elements can be combined into a single device. In one example (not shown), the function device 101 is functionality that is physically incorporated (not shown) into one of the ECDs, such as the cable set-top box 108. More particularly, a processor can provide some or all of the function device's functionality. The term "processor" as the term is used herein is a digital processing unit such as a microcontroller or microprocessor, along with its associated functional hardware and software. The term includes a microprocessor such as is normally found in a personal computer, and its functional software.

In one example of operation of system 100, a consumer (not shown) purchases a new ECD. The consumer takes the new ECD home, and plugs it into an existing home entertainment/ECD system. For example, if the ECD were a set-top box, such as a cable box, a consumer can connect a cable wire to the box, and then connect the box to an audio-visual system. If the system includes an AV receiver, the consumer might use a high-definition media interface (HDMI) cable to connect the cable box to the AV receiver, as further explained below. Once connected into system 100, the following would occur. In this example, the cable box includes a novel function device. The function device within the cable box begins to recognize the various ECDs in the consumer's home system. For example, the function device can determine the manufacturer, type, and particular model of the AV receiver using the CEC protocol over the HDMI cable. Once the identity of the AV receiver is determined, the function device then communicates with the database 112 that includes information about the various control devices. By communicating to database 112 the particular identity of the AV receiver, the database can use the identity information to identify information associated with the particular control device normally supplied to the consumer when the AV receiver is sold. Using the ECD identity information, database 112 returns to the function device in the cable box that particular ECD function information. In some embodiments, it also returns an illustration of the control device supplied by the ECD device manufacturer at the time the ECD is sold to consumers.

Not all ECDs have an ability to communicate via HDMI with the function device. In the case of these other ECDs, the consumer may identify the ECD for the function device. Using a setup procedure, as further explained below, the consumer identifies the other ECDs in the consumer's home entertainment/ECD system.

Once all of the ECDs in the system have been identified, the consumer can then use a single display device (for example, display 102) with two-way communication to the function device to control all of the ECDs, as further explained below.

Display Device

More particularly, as illustrated in FIG. 2, display 102 is a mobile communication device that has a touch screen 114. Display 102 can respond to a user interacting with the input screen 114. For example, when the screen 114 displays a button 130, and the user can interact with the button 130. If the display 102 is a multi-touch screen, the display 102 can react to a user touching the button 130 on the screen 114. In other less preferred embodiments, a user may use a keyboard (not shown) to tab between buttons and touch a key in order to interact with the button, or the user can use a mouse (not shown) to mouse over each button and click to interact with the button. There are many different ways for users to interact with an input screen on a display, all of which are considered possible embodiments.

As a result of the user interaction with the input screen, the user input is communicated to function device 101, and function device 101 takes the information from the button function information database 112 and uses it to create a signal with the control devices button function information. This signal is then output through a signal output to the ECD to be controlled. In one case, the signal output is an IR transmitter, and the signal is an infrared transmission. In other case, the signal output is an HDMI port, and the signal is an HDMI communication that is communicated to the ECD to be controlled by an HDMI cable.

Communication Between Display Device and Function Device

The function device 101 can communicate with the display 102 in many ways. For example, if display 102 is physically located (not shown) in the same device housing as functional device 101, then a data bus can communicate between the display and the function device 101. If the display is physically located in a separate device in a separate housing, as shown in FIG. 2, other means for communicating between the display and the function device 101 are required. In one example (not shown), the display is hard wired to the function device 101. In another example, as shown in FIG. 2, the display communicates wirelessly with the function device 101. While all methods of wireless communication can be used, a preferred method of communication is to use Wi-Fi. In other embodiments (not shown) a cellular network can be used for communication between the function device 101 and the display 102. Other methods of communication can include using coaxial cable, like an RF signal, and an HDMI cable, including using consumer electronic communication (CEC). The communication between the display device 102 and the function device 101 can be one-way or two-way communication. For example, for two-way communication, the function device 101 can output the input screen information to the display device, and the display device can return to the function device 101 information about user interaction.

The display device can take many forms. It could be a television, a personal computer, or a smart phone or smart device such as an Apple Inc. iPhone or iPod Touch, both of which have Wi-Fi communication capabilities. With Wi-Fi communication capabilities, the display device can interact using Wi-Fi with the function device 101.

Communication Between Function Device and Databases

Function device 101 communicates with the button function information database and the database with pictorial records of other devices. These databases can be stored in a database server within the function device 101, or the database can be located remote from function device 101. For example, if the database is on the Internet, then communication with the Internet can permit the function device 101 to communicate with the database. Such communication could be over each Ethernet cable through a modem to a remotely located database server.

Memory

In some instances, user input needs to be recorded. For example if the user of display device 102 selects, as explained below, a particular control device, then the function device 101 will want to retain this information. As a result, the function device 101 will need to communicate with memory to retain this information. So the function device 101 will include some form of memory. The memory may be physically within the same device housing as the function device 101, or it may be located remotely from the function device 101. If located remotely, then some form of communication will need to occur between the function device 101 and the remote memory in order to retrieve the user interaction information. The communication between the memory and the function device 101 can be over a data bus, if located in the same physical housing, or can be over network communication, if located remote from the function device 101. If located remotely, then any of the previously described methods of communication can be used.

Page Server

Figure 6:
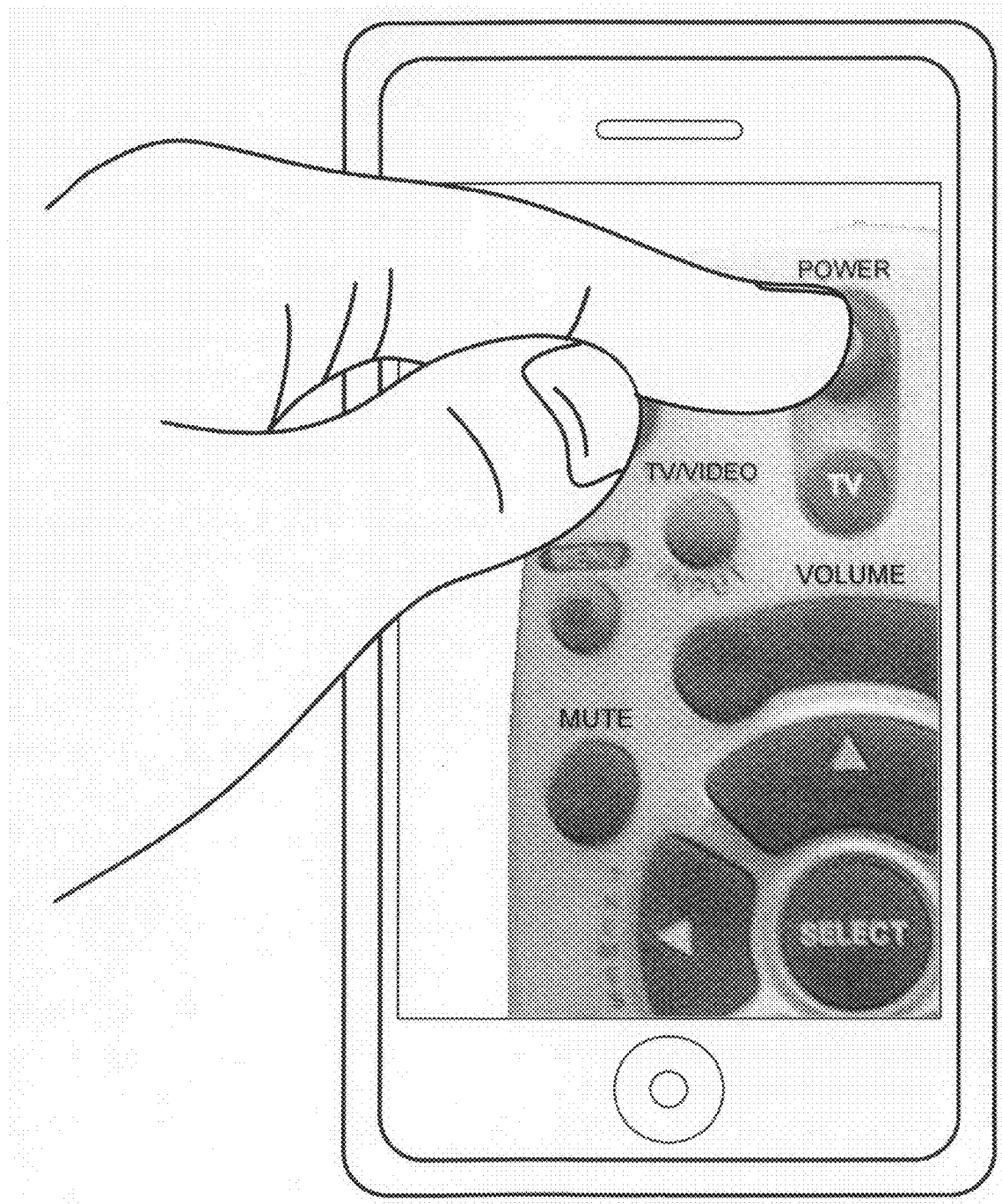
FIG. 6 is a schematic illustration of a display device illustrating a picture of a remote control with a user's finger on one of the illustrated buttons.

In order to display the input screen on display device 102, function device 101 creates an input screen output. In the preferred embodiment, the input screen is a page in a plurality of linked pages. The function device 101 serves the pages using HTML. In other embodiments, other methods, such as by using a stand-alone application to create the input screen can be used. In the preferred embodiment, a browser executing in display device 102 is used to render the input screen on the display of display device 102. Since the user will interact repeatedly with the input screen, it is beneficial if the web browser on the display device supports HTML and user interaction with the HTML. More particularly, in the preferred embodiment, the web browser should support JavaScript to permit user interaction with a button without having to refresh the entire user input screen, or some other form of AJAX (Asynchronous JavaScript and XML) process. Still more particularly, in a preferred embodiment, the display device 102 should support enlargement of any illustration on the display, as shown in FIG. 6.

The page server can be either software processed by the same function device 101 referred to above, or the web server can be located remotely from the function device 101. For example, the web server can be on a network web server, and the function device 101 can communicate with the networked web server. The term "web server" as it is used here is not limited to use on the World Wide Web, but rather is a page server of linked pages, regardless of whether the pages are part of the World Wide Web or whether the pages are only locally accessible.

Function Device and ECD Communication

Figure 17:
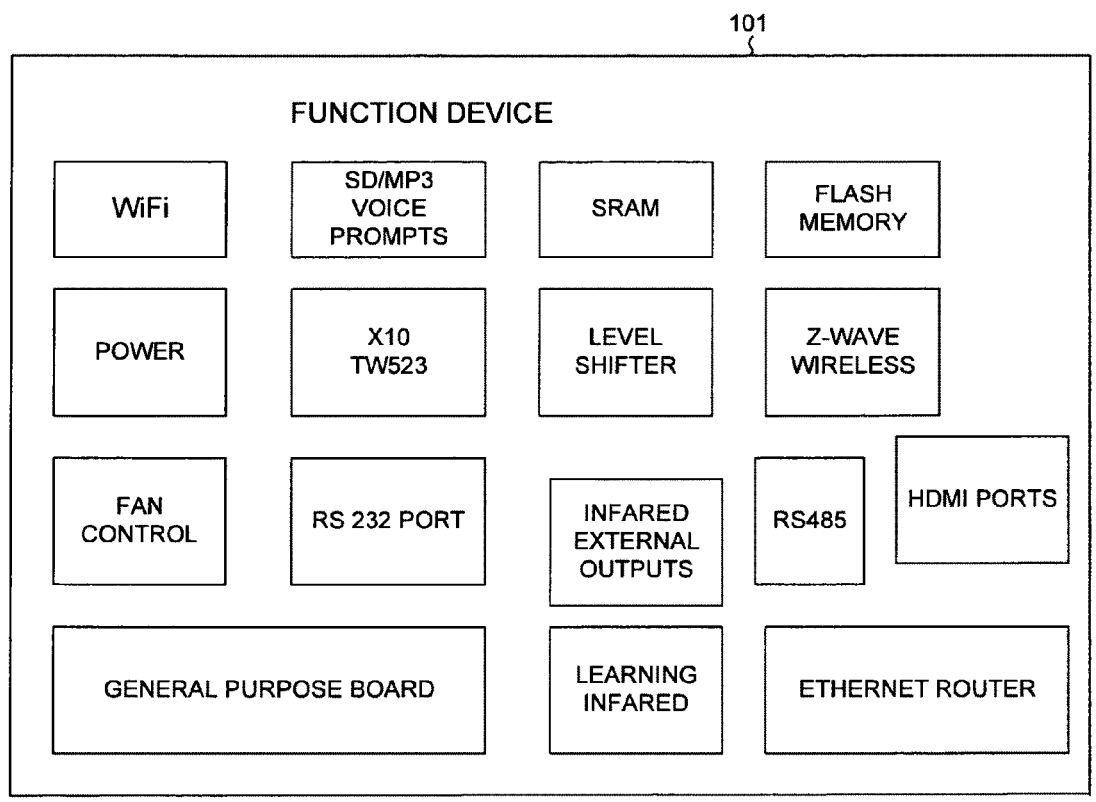
FIG. 17 is a schematic illustration of a function device.
Figure 17A:
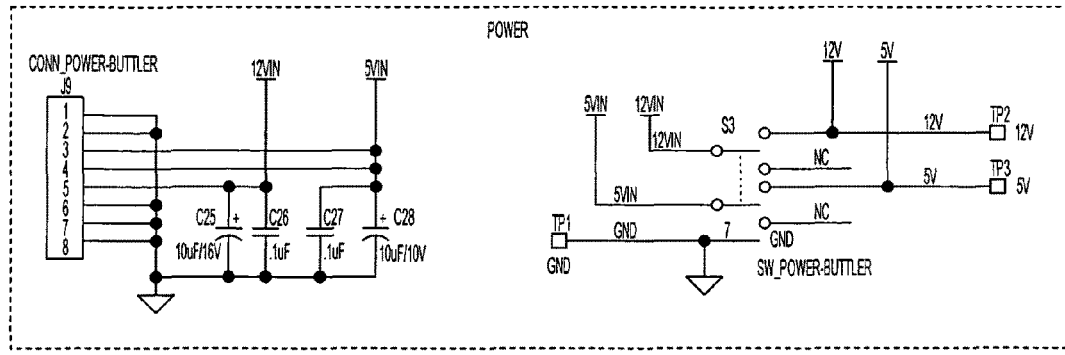
Figure 17B:
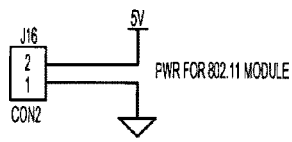
Figure 17D:
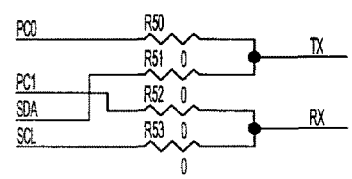
Figure 17C:
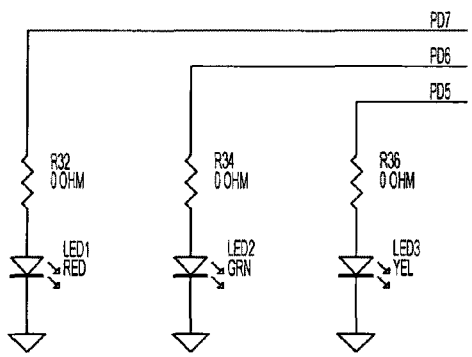
Figure 17E:
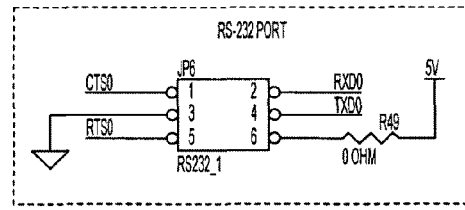
Figure 17F:
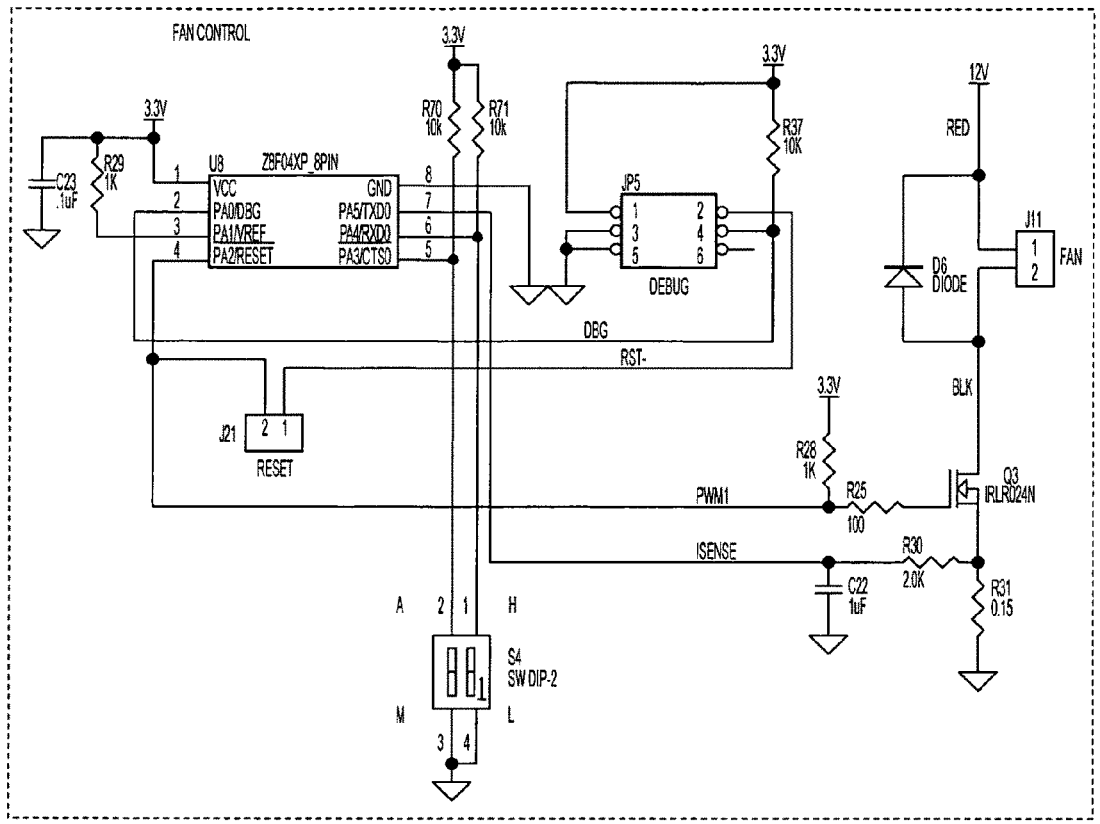
Figure 17G:
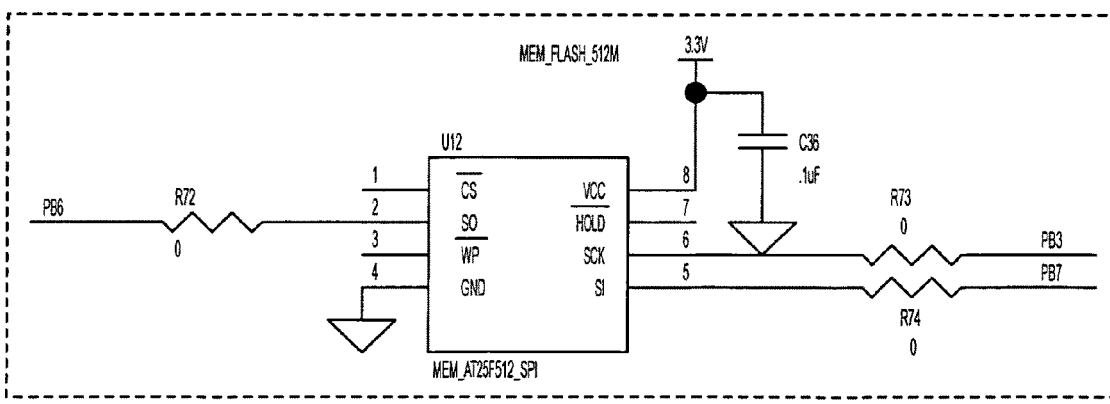
Figure 17H:
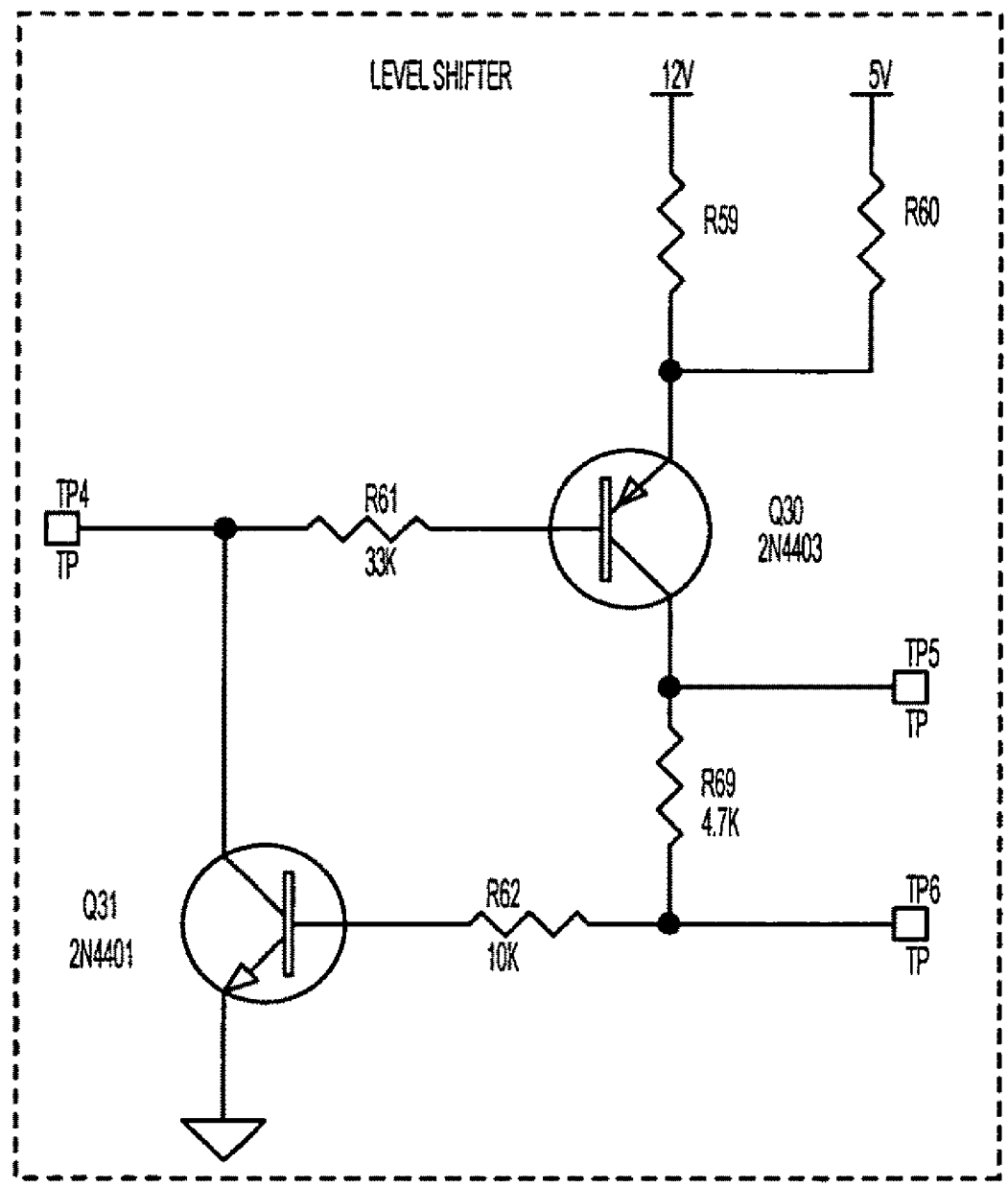
Figure 17I:
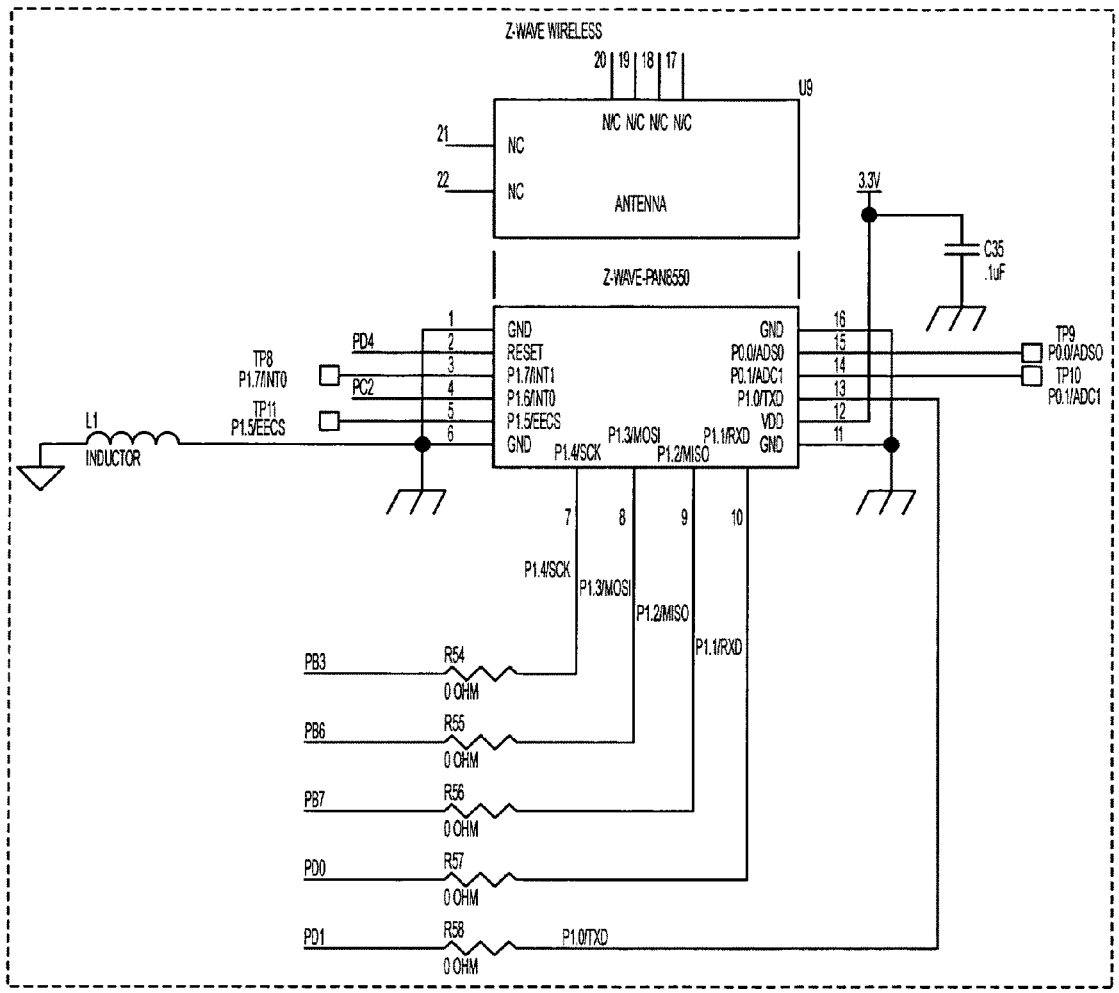
Figure 17J:
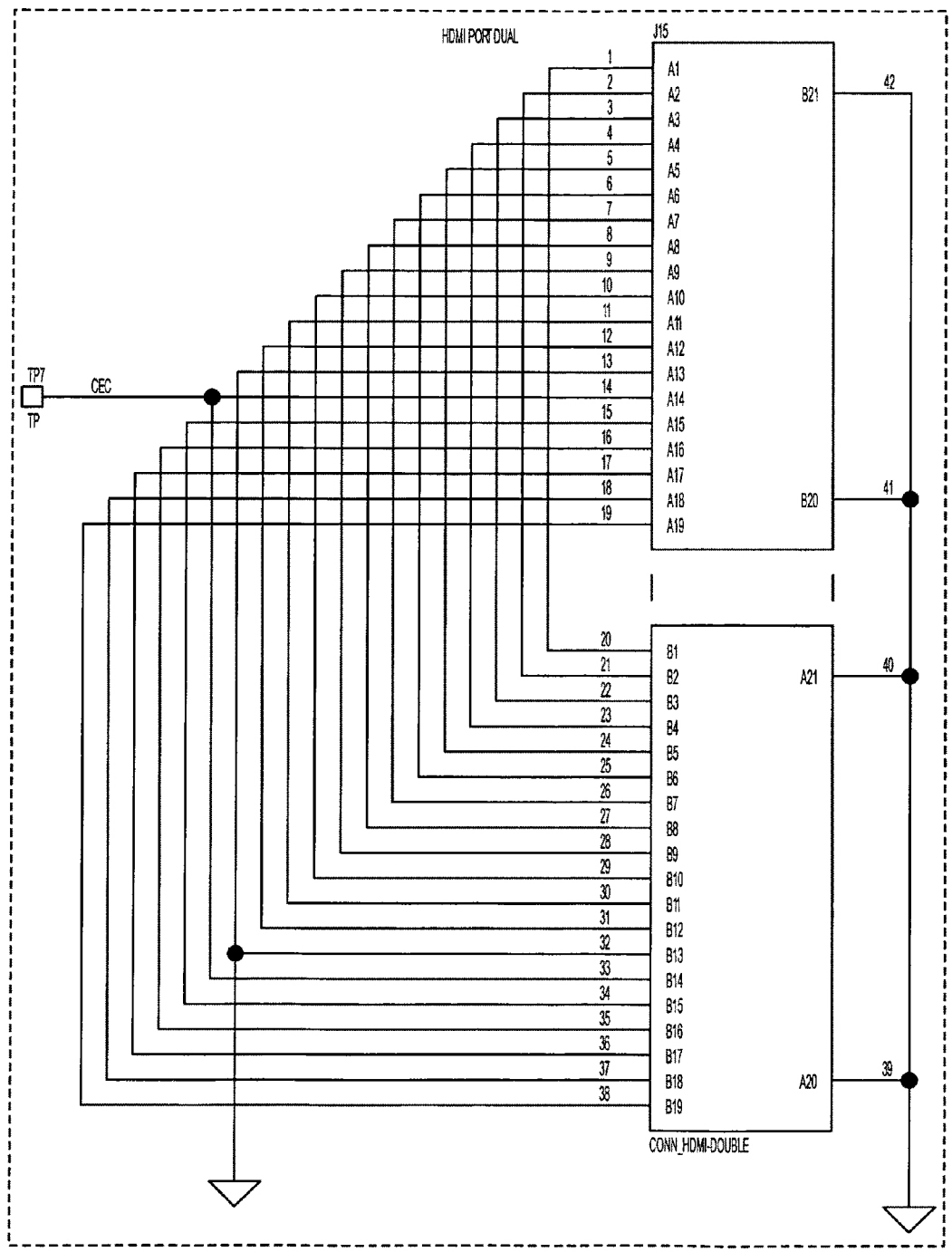
Figure 17K:
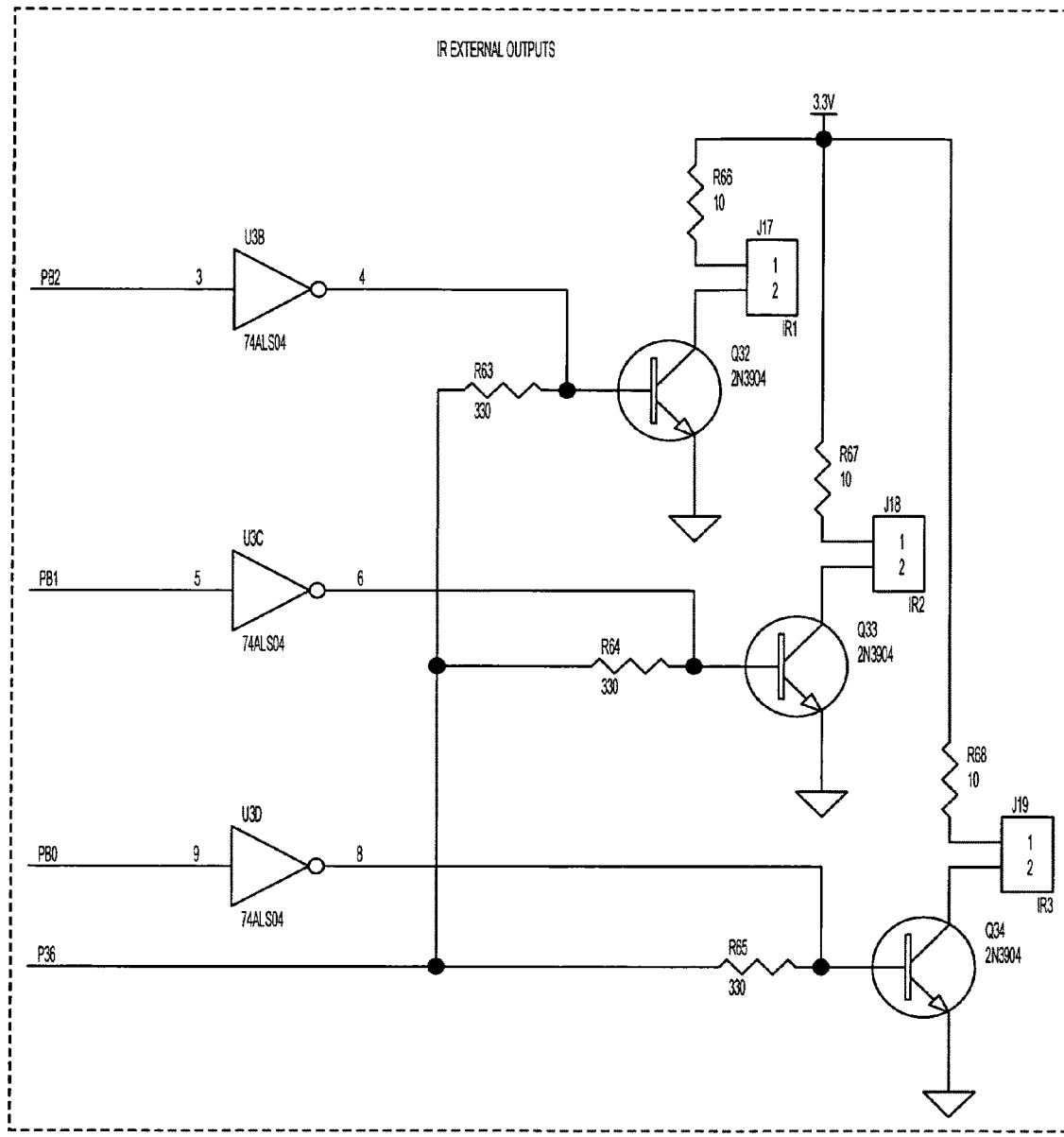
Figure 17L:
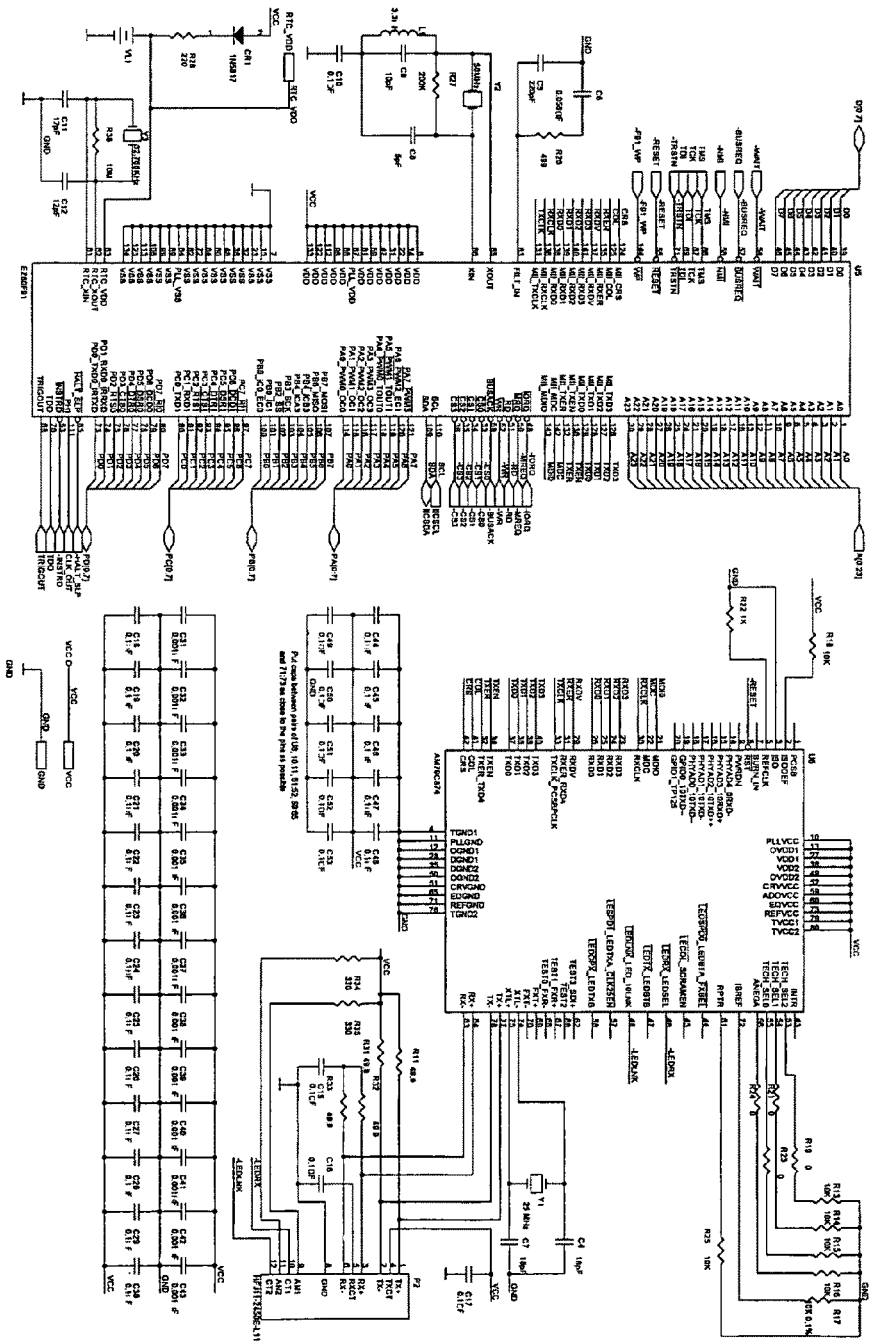
Figure 17M:
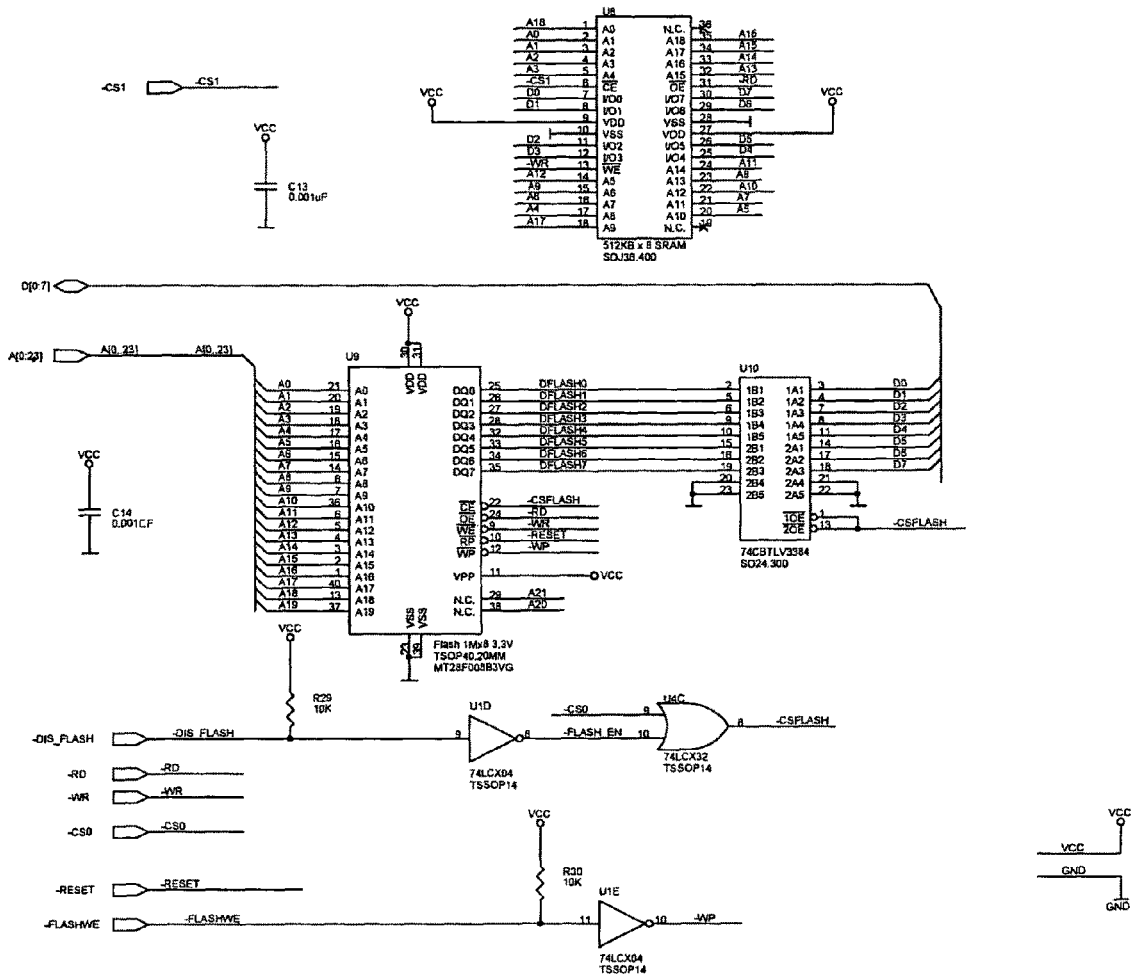

As mentioned earlier, function device 101 communicates with various ECDs. The communication can use any of the above-described methods of communicating a signal, such as using infrared Wi-Fi, HDMI, CEC and/or RF. Another form of communication between the function device 101 in the ECDs may be a zWave, or Zigbee, which is a known method of communication between household ECDs such as light switches and devices for its controlling the light switch. In many cases, the communication will be one way. For example, the function device 101 can cause a television to turn on. Or function device 101 can tell the television volume to increase. In other circumstances, two-way communication can occur between function device 101 and the ECD. For example, if communicating over HDMI or zWave, a signal to turn on can be communicated to a light switch, and some sort of response indicating the light did in fact turn on can be returned to function device 101, so that the user can confirm that the light was turned on. In still other examples, as described below, the existence of a particular ECD may be communicated to function device 101 through such two-way communication. Other methods of communication can also include X10 and RS-485, as illustrated in FIG. 17.

Mood Buttons

Figure 7:
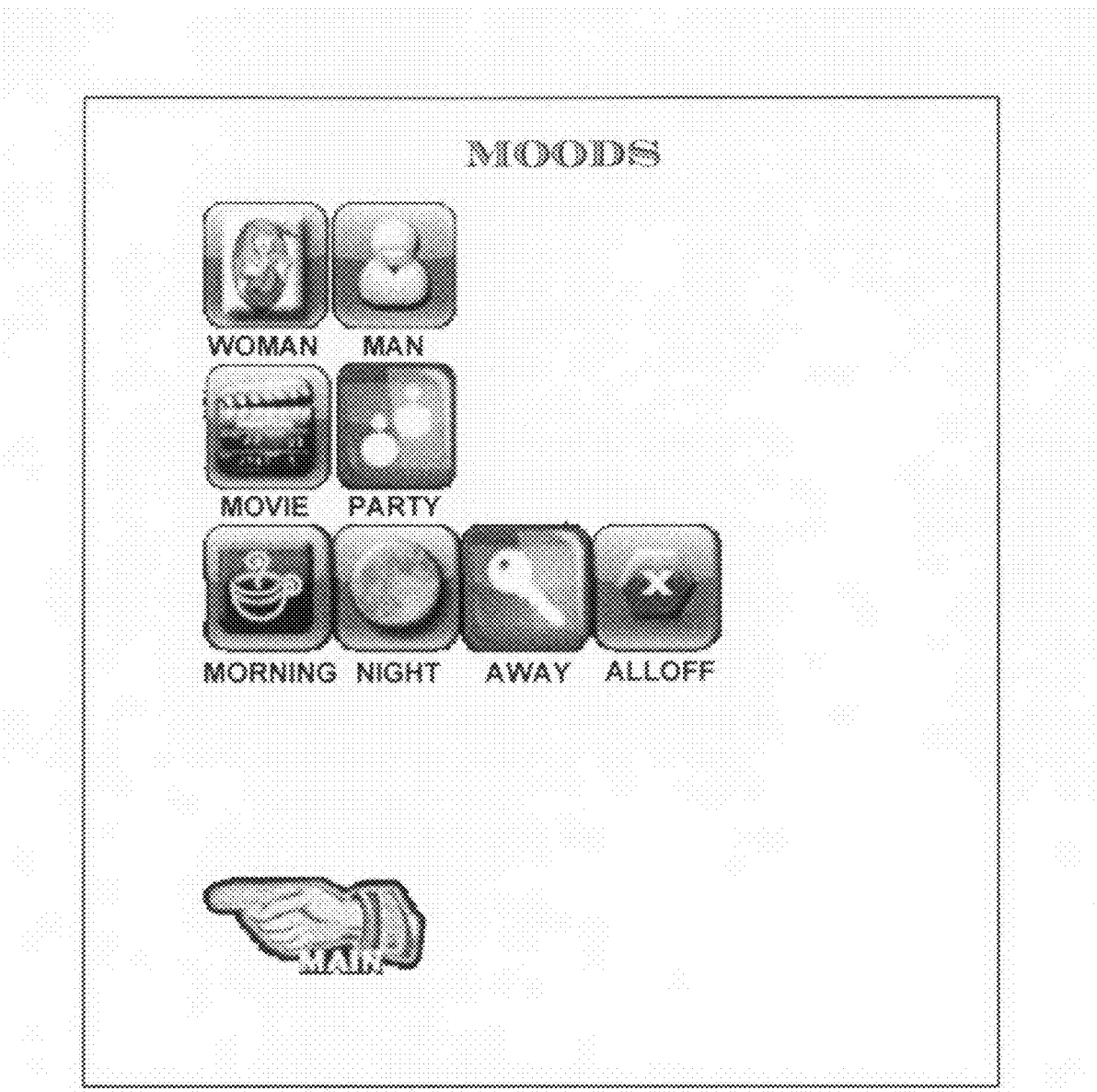
FIG. 7 is an illustration of a display device including buttons that cause a collection of changes in the function of electronic consumer devices, based on the different interests or moods of the user.

In addition to merely responding to user input regarding button interaction, the system can also handle more complicated actions. For example, a combination of many button functions can occur in response to the user interaction with one particular button. For example, a user can in the morning turn on various ECDs. Lights can be turned on, and a coffee pot started. For example, one button labeled MORNING, as illustrated in FIG. 7, can be used on the display device to cause these various different ECD function commands to be output by the function device 101, in response to the user interacting with the MORNING button on the display device.

Pictorial Database

Figure 3:
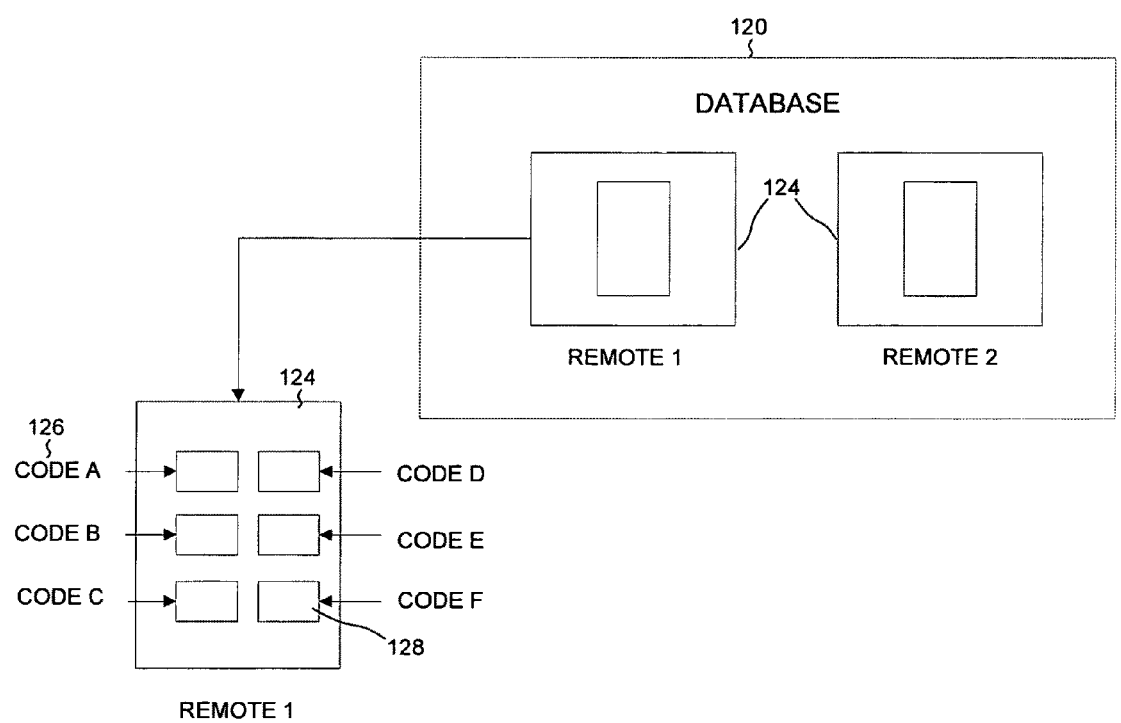
FIG. 3 is a schematic illustration of a database including a plurality of records regarding various remote controls, including a schematic illustration of some of the detail included in each of the records.
Figure 4A:
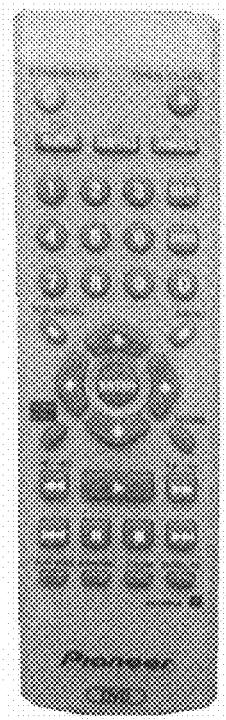
FIG. 4 is an illustration of various control devices used for controlling electronic consumer devices.
Figure 4B:
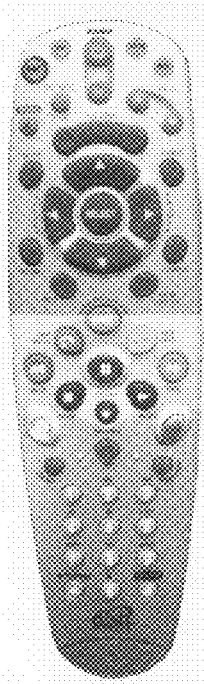
Figure 4C:
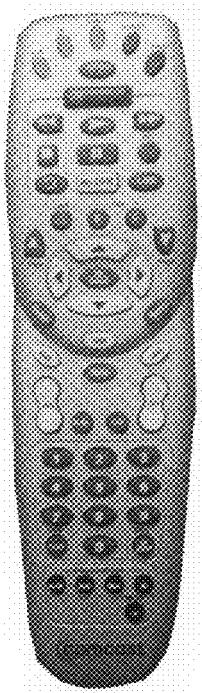
Figure 4D:
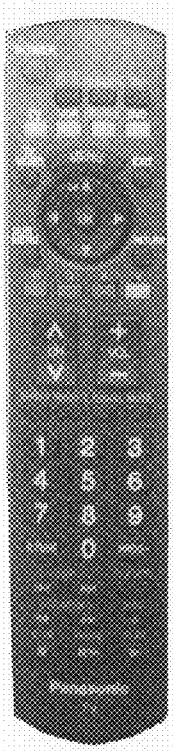

Referring again to the database that contains the pictorial records, an example database 120 is illustrated in FIG. 3. Database 120 includes records 124 for different control devices, and each record 124 includes information on the control device's shape, the button layout of the control device, and the button labels and other text that can appear on the control device. Each record 124 also includes the code 126 or signals associated with each button 128 on the control device 124. These codes may, for example, be referred to as keycodes.

Figure 14:
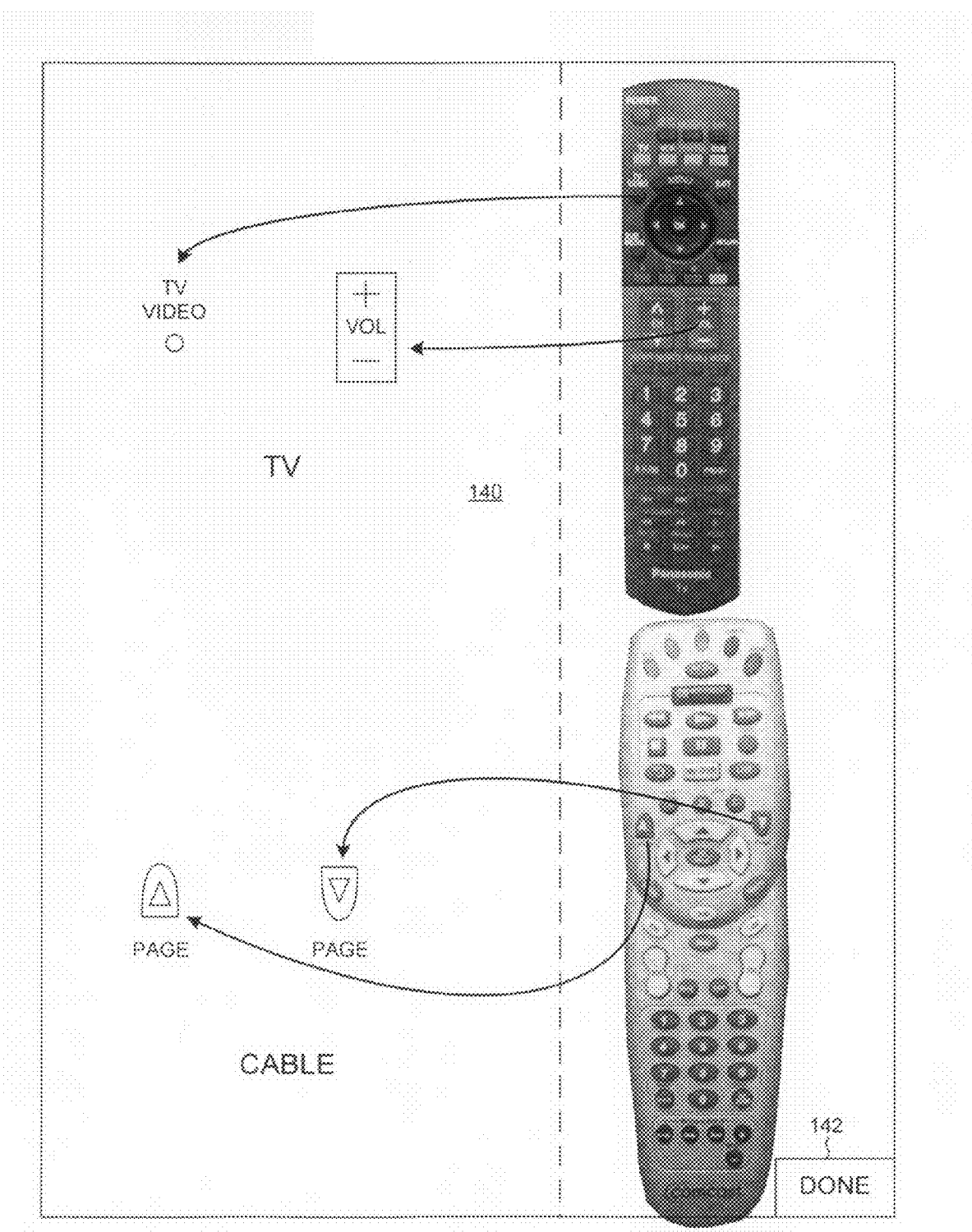
FIG. 14 illustrates a resulting smaller custom device screen.

FIG. 4 illustrates a sample selection of device shapes and button layouts. Various pieces of text (such as the ECD manufacturer, as best seen in FIG. 14) also appear in various locations on each device. In addition to such text, various symbols also appear on each device, either on the buttons or otherwise. The pictorial database includes this information regarding the symbols, the buttons, the shapes of the buttons, the button locations, and the shape of the overall control device. In other less preferred embodiments, a subset of this information can be used.

Types of Control Devices

Figures 5A, 5B:
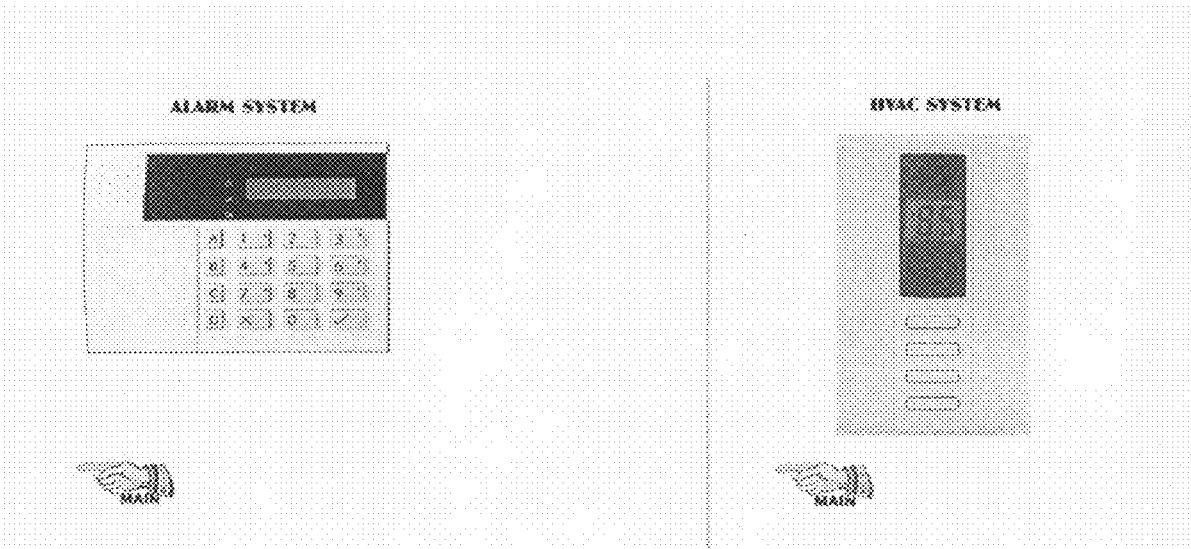
FIG. 5 is an illustration of other control devices for controlling electronic consumer devices including a device for controlling lights that may be turned on or off or dimmed or brightened.
Figure 5C:
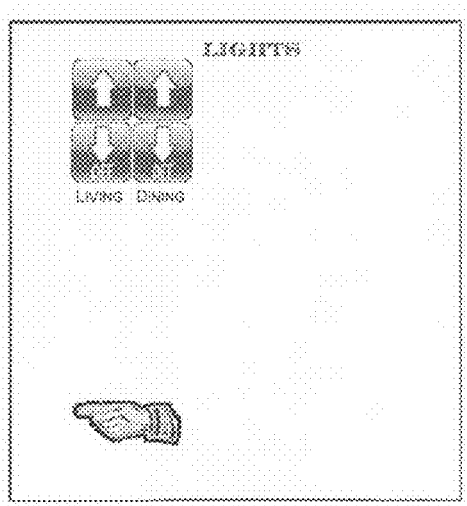

The pictorial database includes information on many different kinds of other devices. For example, reference can be made to FIGS. 5A and 5B illustrating various sample control devices used for control of ECDs, such as a DVD, cable box, a DVD player, and a television. Other ECDs include, for example, referring to the Figure illustrating other control devices, an alarm system, and HVAC control, as well as a light switch wall plate.

Types of ECD Interaction and Display Response

In regard to lights, lights can be turned on or off or dimmed or brightened. In addition to having the buttons merely respond to user input, the buttons can also change color or otherwise respond to user interaction. For example, if a light is turned on, a button on display device 102 can change color to indicate that the light is on.

Main Input Screen

Figure 8:
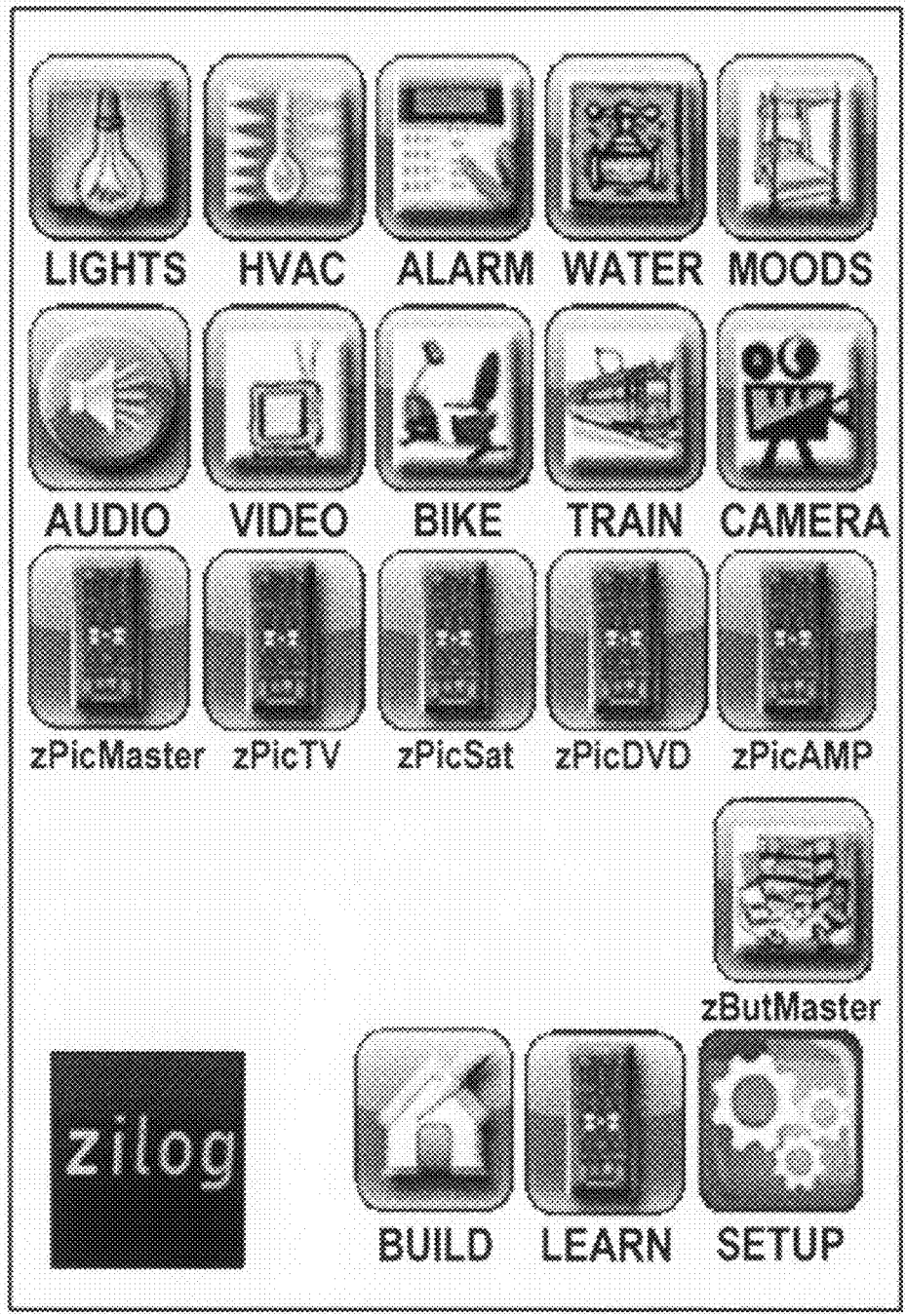
FIG. 8 is a diagram of a display with an illustration of a possible main menu that permits a user to select various functions.

The main input screen shown on the display device can permit a user to select generally the category of user desired ECD interaction. An example of a main input screen is shown in FIG. 8. The user can select which type of ECD to use. In addition, the user can select various custom control devices, created as explained below. In addition, the user can choose to build a new custom control device, to teach the device to learn how to behave like an existing control device, or to set up the function device 101, as explained below.

IR Learning

In addition to the function device 101 communicating with a database of pictorial records and other button information, the system can also learn a particular control device's button function information. This can be done using an IR learning process, as commonly known in the art.

System Setup

Figure 10:
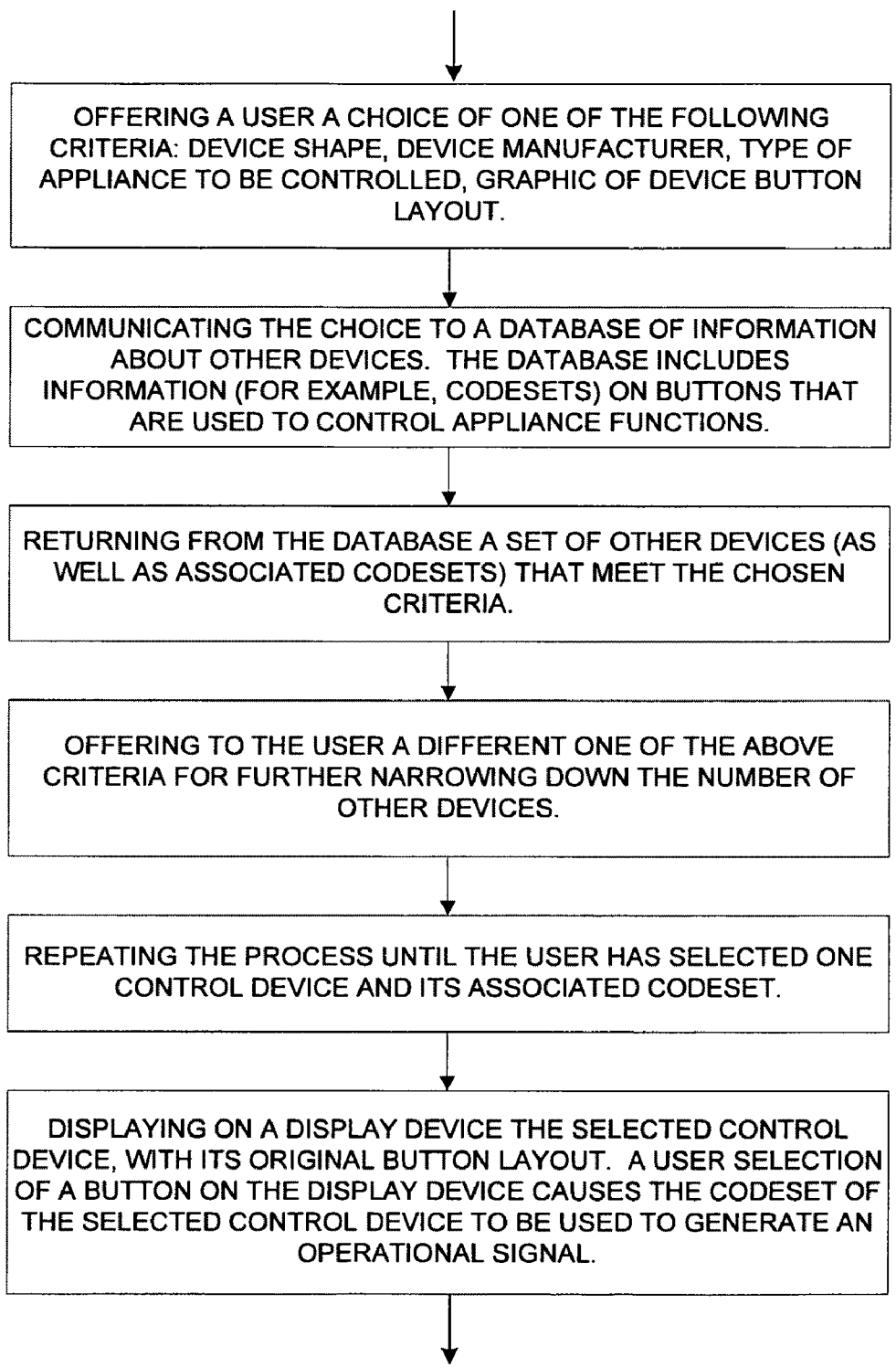
FIG. 10 is a schematic illustration of how possible choices available to a user can be limited.
Figure 11:
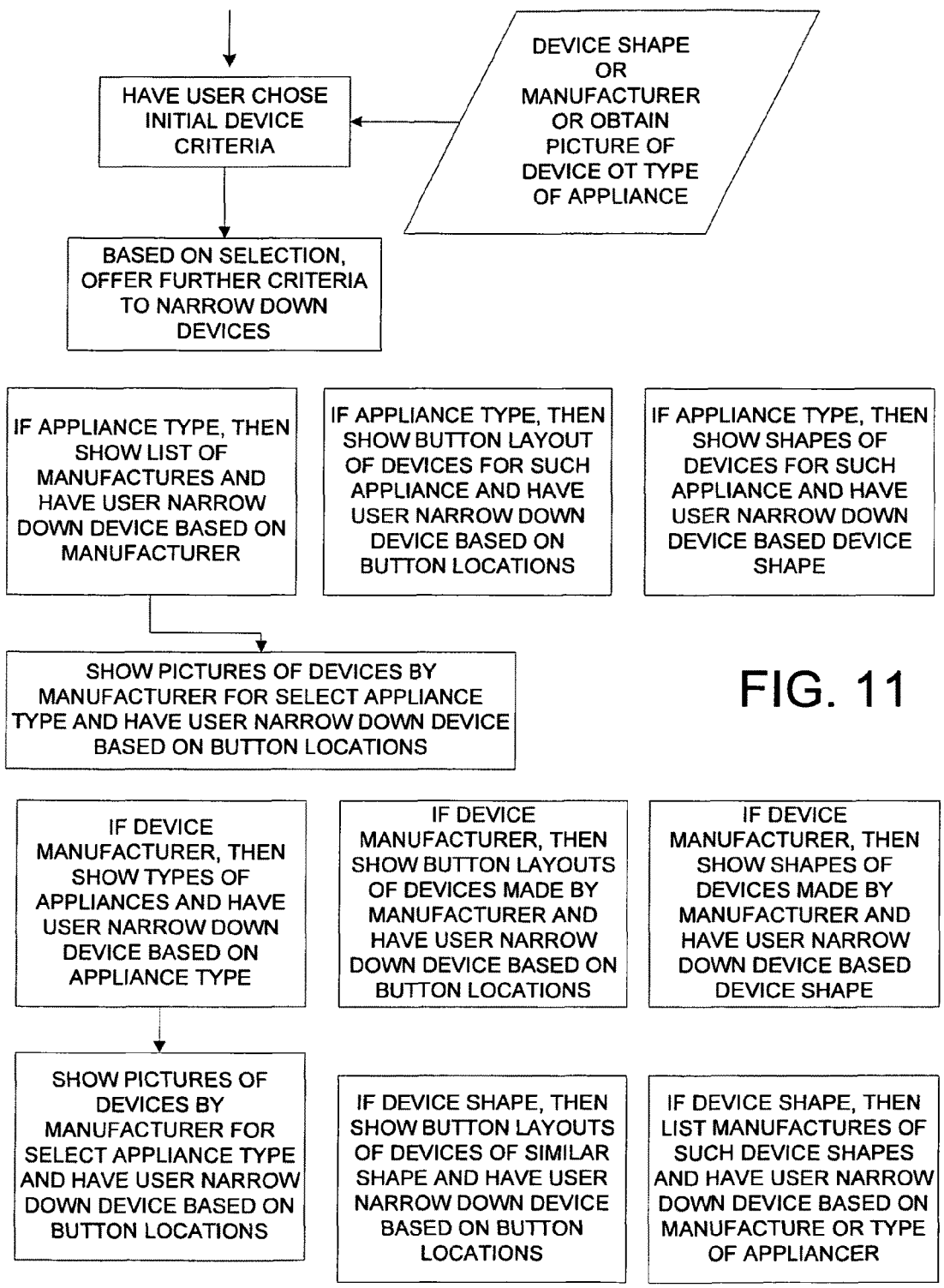

An important aspect of the system of FIG. 2 is the ability of the system to permit easy setup of the system. Setup as used herein means the selection of the choice of control devices to be imitated. An example of a setup procedure, as illustrated in FIG. 10, is as follows. Function device 101 outputs a user input screen to display device 102. The input screen, as rendered on the display of display device 102, presents the user with a choice of a one of the following criteria: a control device's shape, a control device manufacturer, a control device type of ECD to be controlled, and a selection of other device button layouts. The user interacts with the input screen to select one of the criteria. Display device 102 then communicates with function device 101, and the function device 101 communicates with the device pictorial database to reduce the number of other devices of interest to the user. For example, if the user selects the manufacturer "Sony" from a list of ECD manufacturers presented to the user, then only Sony devices would be available to the user for further selection. More particularly, as illustrated in FIG. 11, the second criterion will depend on the first criterion selected by the user. For example, if ECD type, such as DVD or television or receiver, was selected as the first criterion, than a second choice presented to the user may be a list of ECD manufacturers. Another option would be to show a selection of button layouts for other devices, or to show the shapes of other devices. When the second criterion is then selected, the display device 102 will communicate again with function device 101, which in turn will communicate with the device database. As a result of the narrower criterion, the set of possible choices presented to the user will be further narrowed. The set of possible choices is then returned to the function device 101, and the function device 101 creates an input display screen with a more limited selection choices. The user interacts with the user input screen to select a particular device of interest to the user. If, in the first instance, the user selected device manufacturer, then the second criterion may be to show the types of ECDs made by that manufacturer. In the alternative, after selecting a device manufacturer, the second criteria may be button layouts of devices made by that manufacturer, or the shapes of such devices. Likewise, if device shape is the first criterion, then the second criterion can be either a button layout or the device manufacturer or the type of ECD.

Processing the Selected Device

Once a particular control device is selected, then display device 101 communicates the device selection to the function device 101. Function device 101 in turn communicates with the device pictorial record database to return to the function device 101 a pictorial record for the selected device. The pictorial record shows the control device shape, the button layout on the control device, and any text that appears on the control device. Function device 101 also obtains all of the button function information from the button information database. The button function database referred to here is sometimes referred to as a codeset database. The button information database can be the same database as the pictorial database, or it may be another database.

Once function device 101 has obtained all necessary the information about the control device to imitate the control device, an illustration of the control device is output, via the page server, to the display device along with codeset information and/or other information usable to imitate the original control device. The illustration appears on the user input screen that is displayed on the display device. The user then can interact with the buttons on the user input screen to select various device functions of the control device.

Using Communication with an ECD to Identify a Control Device

Figure 9:
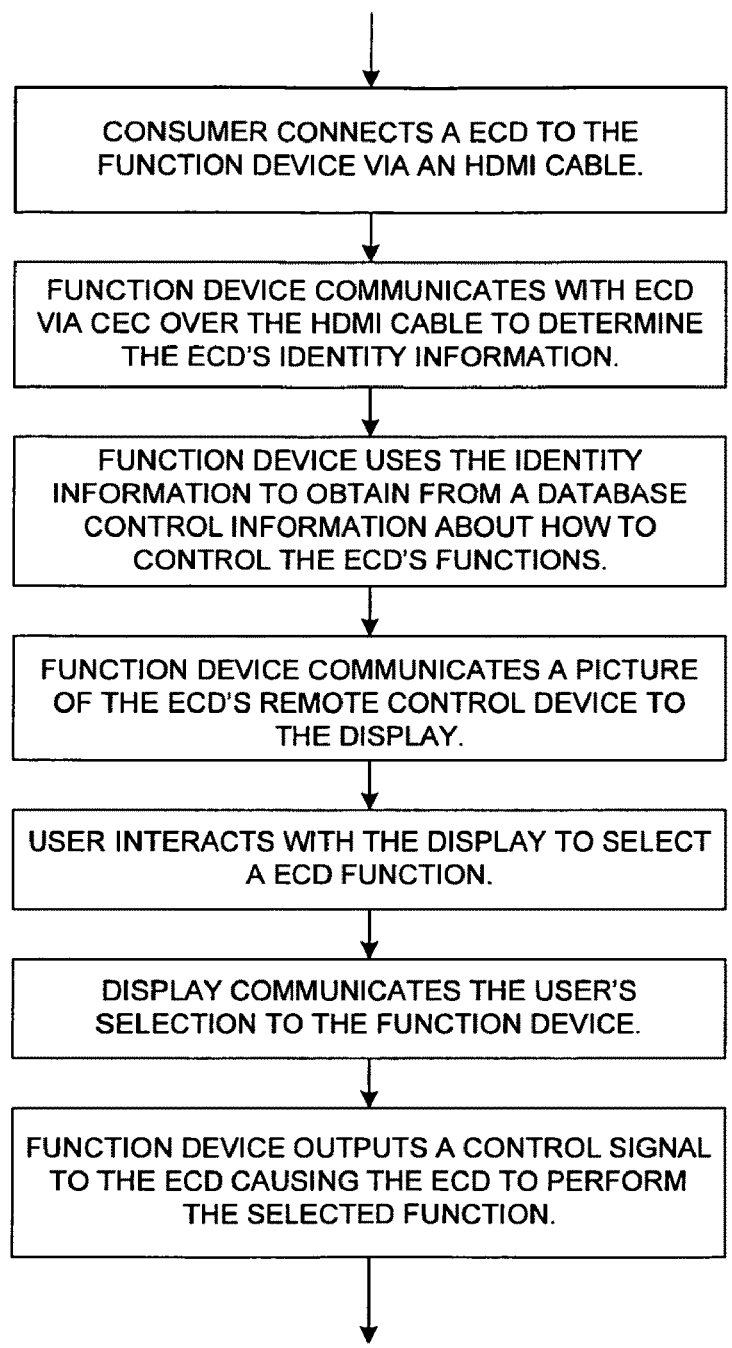
FIG. 9 is an illustration of a method of how a consumer can set up the system to control electronic consumer devices.

Another method of obtaining information about what ECDs the user wants to control involves having function device 101 output a communication query signal across the HDMI-CEC bus to any newly connected ECDs, as shown in FIG. 9. The newly connected ECD automatically responds by communicating back ECD identification information across the CEC bus. This ECD identification information may include a brand name in ASCII characters, a device type in ASCII characters, and a model number in ASCII characters. Function device 101 parses and interprets this returning ECD identification information, and then forwards some or all of it, or a determination based on it, to the control device pictorial database. The pictorial database returns an illustration of the associated control device, which is forwarded to display device 102 so an image of the control device is displayed to the user on display device 102.

Using an Image of a Control Device to Identify a Control Device

Figure 12:
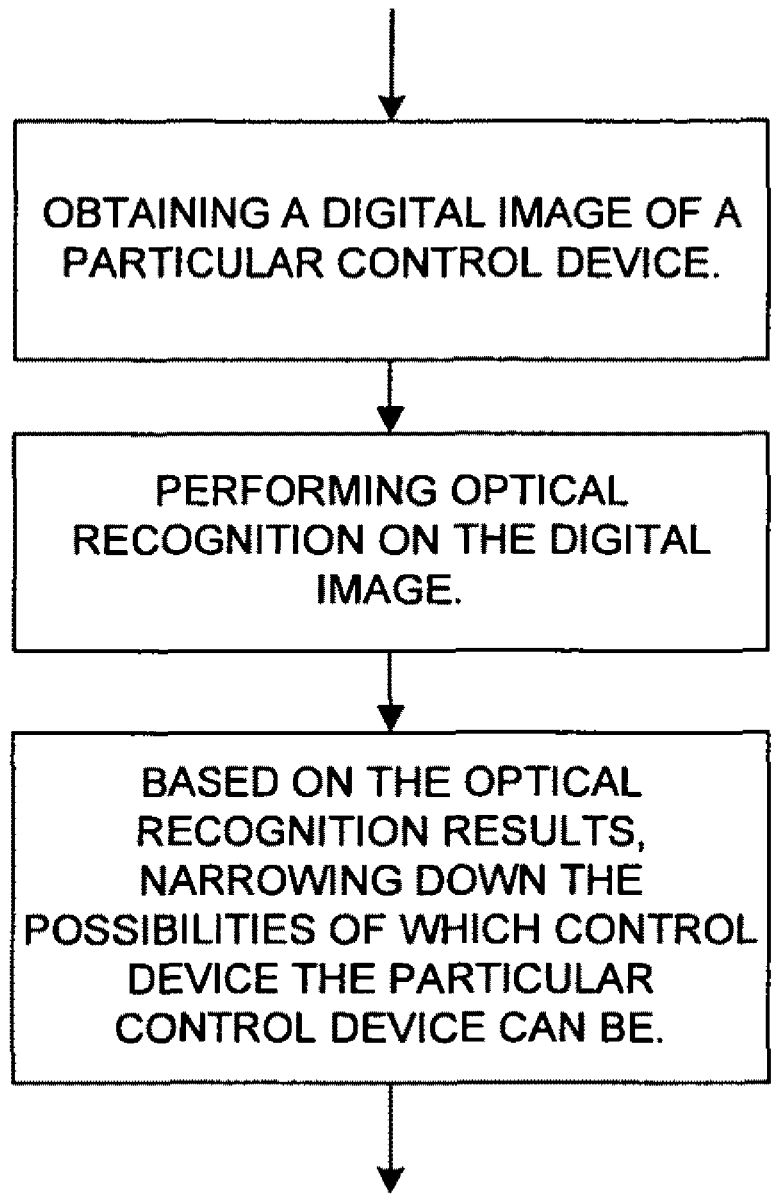
FIG. 12 is a flowchart showing how a consumer can obtain a digital image of a particular device, and then use that image to identify a specific database record referencing that particular control device.
Figure 13:
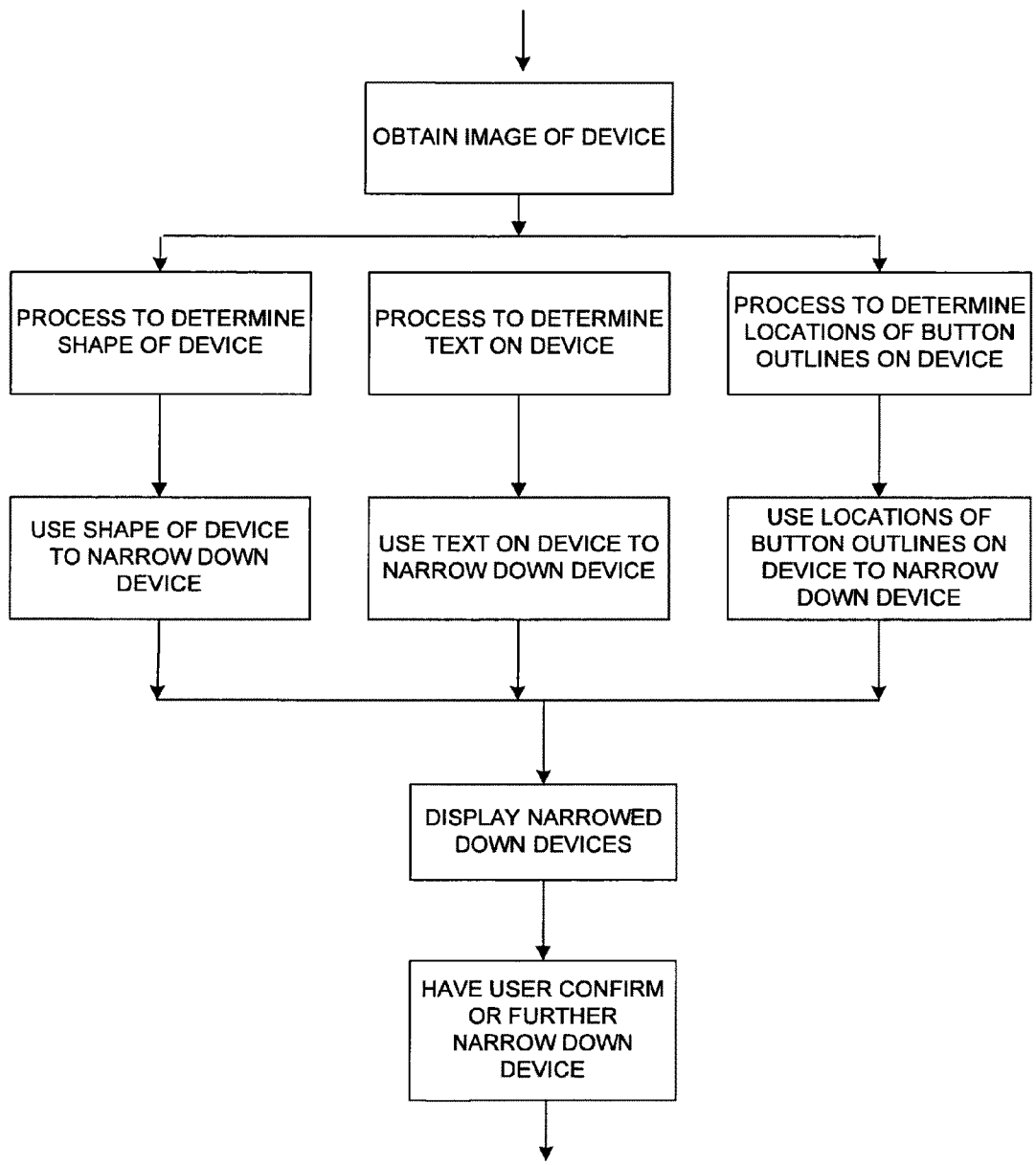
FIG. 13 illustrates how a custom device screen can be created.

Another method of obtaining information from a user regarding a particular control device to be imitated by the system, is to begin with a digital photograph of the control device to be imitated, as illustrated in FIGS. 11 and 12. The user can obtain this digital photograph (image) using a digital camera. For example, the Apple iPhone has a digital camera built into the smart phone. Once the digital camera captures an image of the control device to be imitated (for example, as a JPEG file), the image is communicated to the function device 101 using any suitable method of communication. With an Apple iPhone, the image could be transferred via Wi-Fi to the function device 101. In one particular embodiment, display device 102 is a cellular telephone having a camera functionality, and the cellular telephone is used to capture a digital image and to transmit the digital photograph to function device 101.

Function device 101 then analyzes the digital photograph (image) or communicates with another function device 101 that analyzes the digital photograph or image. The analyzing function device typically uses optical recognition techniques to analyze one of more of the following characteristics of the image: the shape of the outer contour of the pictured control device, the location and number of buttons on the pictured control device, the characters or text appearing on the buttons, and any characters or text of other printing that appears on the control device. Any one or all of the above pieces of extracted graphical information can be extracted from the raw digital photograph. This information can be obtained from the digital image using known optical recognition approaches, or by using techniques used with facial recognition, for example. Once the graphical information has been extracted using optical recognition, the extracted information is communicated to a database that includes similar types of previously extracted graphical information about other control devices. Based on such extracted graphical information, a particular control device in the database is selected as the best match. After the particular control device has been selected, information particular to the particular control device is communicated back to the function device 101. Function device 101 may forward the information to display device 102.

More Particulars Regarding What is Analyzed in the Digital Image

By referring to FIG. 4 illustrating a sample selection of control device shapes and button layouts, it can be observed that often control devices have unique shapes. For example, in FIG. 4B, one remote has a tear drop type of shape. The control device in FIG. 4D has a relatively straight sided shape with parallel sides, but with rounded ends. The device in FIG. 4A has straight parallel sides and relatively straight parallel ends, while the device in FIG. 4C has a rounded contour in the middle of the device, which makes it readily distinguishable from the control devices. This device shape information can be used by the optical recognition software executing in function device 101 to identify a particular control device. In addition, by referring to this same figure, one can observe various characters on the devices. In some instances, the characters identify the device manufacturer. This information can be used to select or narrow down the particular devices of interest. In addition, the button layout, and the symbols on the buttons, as illustrated in this figure, can also be used.

Device Operation

Once the narrowing down process has concluded and a particular control device has been identified, an illustration of the identified control device is made to be displayed on display device 102 and the user can interact with the control device illustration to select a control device button to create a signal to control an ECD function. Once the user has identified multiple such control devices (for example, that might be usable to operate various different ECDs in the user's home), the user can then interact with the illustrations of the control devices to imitate the operation of the control devices. When the user selects a particular button on an illustration, for example, the display device communicates with the function device 101, telling the function device 101 what button was selected. The function device 101 then outputs a signal to a signal output, which, for example, can be an IR emitter, that then emits the appropriate IR code for that function for that particular ECD, so that the particular ECD can respond to that command. Alternatively the signal output is a hardwired bus port such as, for example, an HDMI port into which an HDMI cable is plugged.

Custom Control Device Creation

In addition to permitting the user to interact with ECDs by using illustrations of the control devices typically used to control such ECDs, the system of FIG. 2 offers the creation of a custom control device. A custom control device is one that realized a selection of button functions from multiple different control devices. To create such a custom control device, the function device 101 outputs at least one collection of button information from one of the control devices of interest to the user. In the preferred embodiment, the original button layout, including the shape of the control device, is displayed on the user input screen, as illustrated in FIG. 14. The user then interacts with the buttons on the user input screen, by either selecting a button, choosing a menu option or other control that says use such button, or, in the preferred embodiment, by dragging and dropping the illustrated button to another location on the input screen. In this manner, the user makes that particular button part of the custom control device illustration 140. By then continuing to choose various buttons, these various buttons and button functions are added to the custom control device. In the end, the custom control device includes a collection of buttons and button functions from the depicted other control devices of interest to the user. After completing the building or creating of the custom control device, a done or finish button 142 is selected by the user, and this user input is communicated to the function device 101. The function device 101 then creates the custom control device illustration. The custom control device illustration is then output to the display device.

In one embodiment, as illustrated in FIG. 14, the custom control device buttons used to control a television, for example, can be the buttons used to control the television in a custom control device area labeled TV. Likewise, the buttons used to control a cable set-top box could be gathered in a custom control device location entitled Cable. To build the custom control device, the user drags and drops selected buttons from the illustrations appearing to the right in FIG. 14. These selected buttons are dropped in the area illustrated to the left in FIG. 14.

Figure 15:
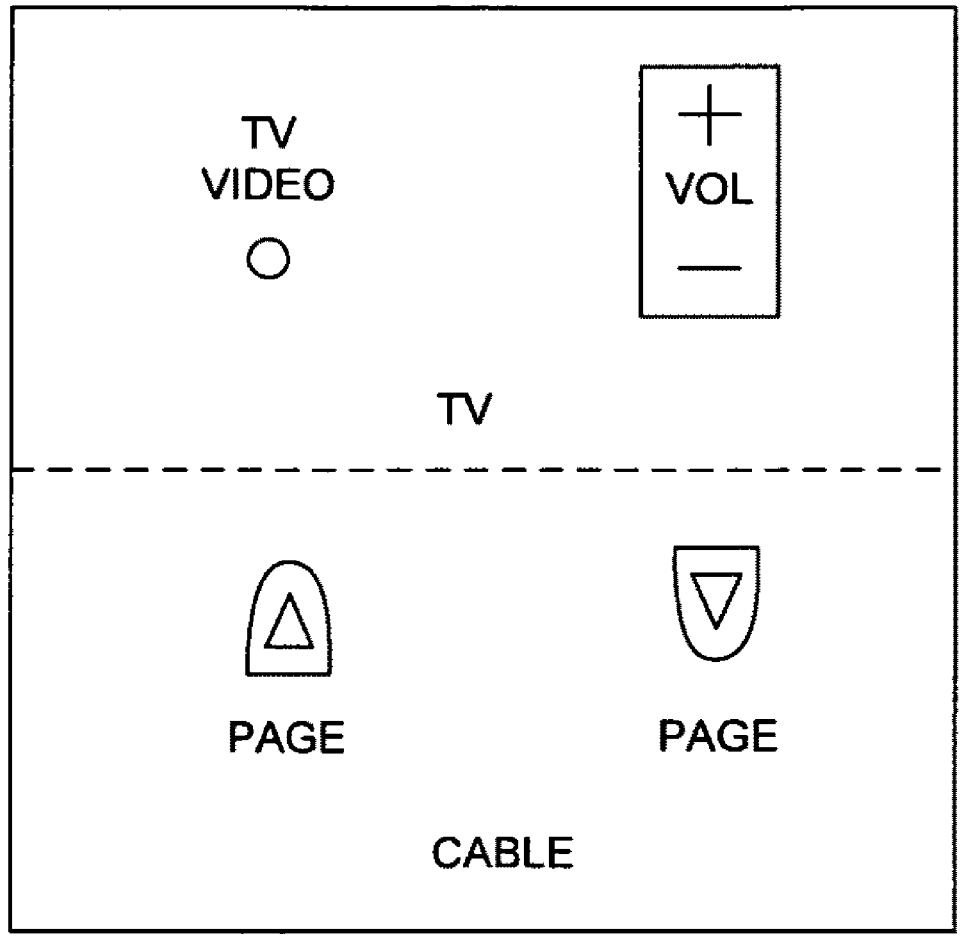
FIG. 15 illustrates a possible device button layout that can be programmed for a particular control device of interest.

By including only particular buttons of interest to the user on the custom control device, the custom control device offers a simpler device for control of ECDs. In the preferred embodiment, the custom control device ends up with an illustration of buttons, as shown in FIG. 15, which is much more compact in size than the original shape of the various other devices of interest to the user. This permits the button sizes to be larger, making it easier for user interaction. This also simplifies the amount of information the user has to deal with in order to interact with the various ECDs.

Assigning Functions to Custom Control Device Buttons

Figure 16:
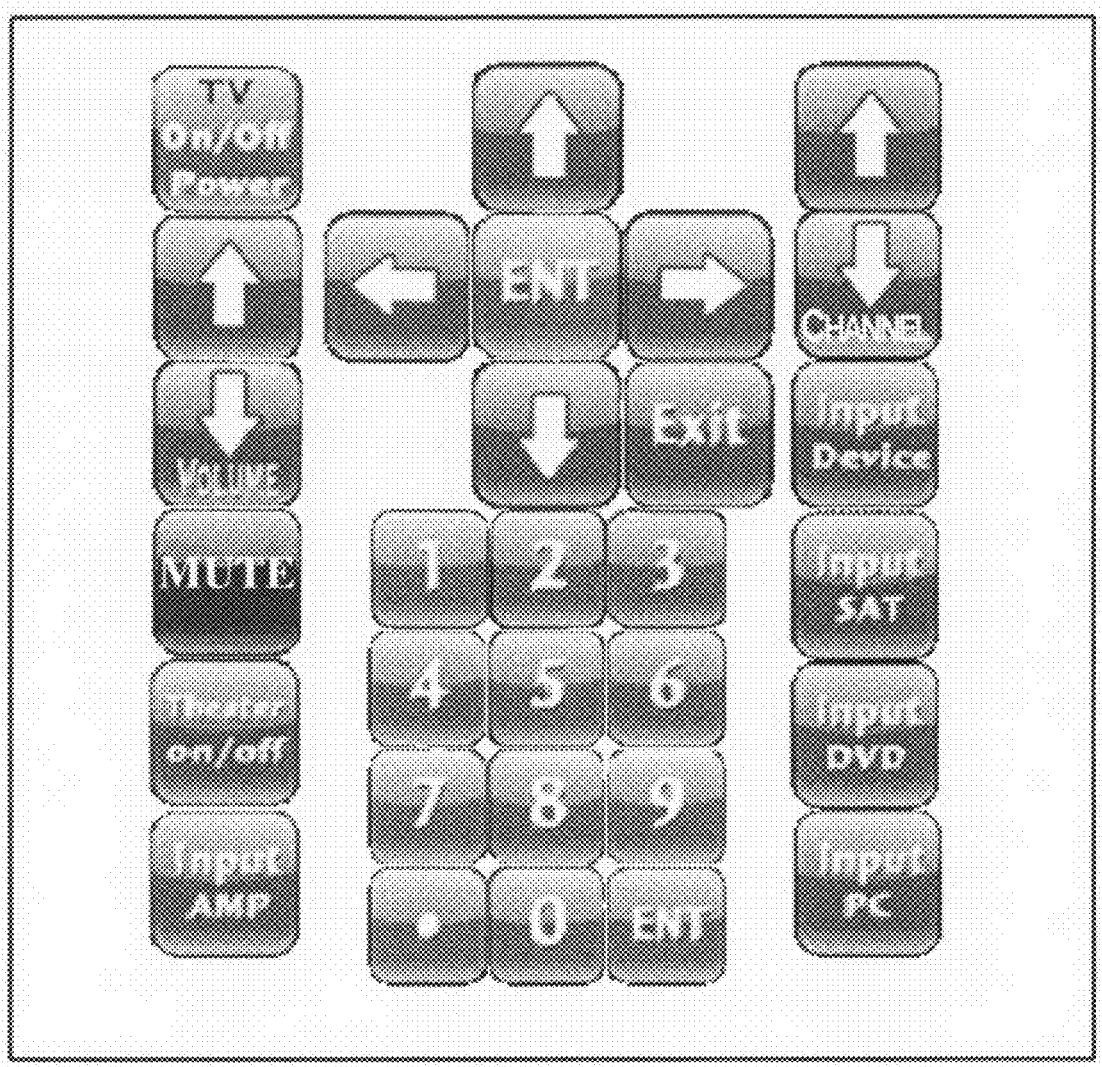
FIG. 16 an illustration of a template custom control device with existing buttons, where the user then assigns a button function to each of the buttons on the template.

In FIG. 16, another approach to custom control device creation is illustrated. In this procedure, the user input screen begins with a template custom control device with existing buttons. The user then assigns various button functions to each of the buttons on the template custom control device. This is done in a fashion similar to the description of selection of buttons referred to earlier. The control device of interest to the user is illustrated, and the user drags and drops buttons of interest from the illustrated control device to the template custom control device, thereby assigning functions of the selected buttons to the buttons on the custom control device.

As shown in FIGS. 15 and 16, the resulting custom control device input screens are much simpler than the original, relatively busy, control devices.

Function Device Construction

The function device 101 can include various components. The components may be housed in one housing, or in separate housing with communication between the various housings. In the embodiment in Figure, the function device 101 includes a power source, a fan control, a RS-232 port, and a general-purpose processor board. The function device 101 also includes flash memory, z-wave, X10 and RS-485 wireless communication, and IR learning. The function device 101 also includes IR outputs, HDMI ports, and a level shifter. The function device 101 also includes Wi-Fi inputs and outputs, SRAM, RS-485, an Ethernet router, and an X10 TW523. The particulars regarding these various components are illustrated in FIGS. 17A through 17K, 17L, 17L1 through 17L4, 17M, 17M1, and 17M2.

Although certain specific exemplary embodiments are described above in order to illustrate the invention, the invention is not limited to the specific embodiments. The use of an HDMI-CEC communication to identify a remote control device usable to control an ECD, or to identify a codeset usable to control an ECD, has general applicability. The use of a digital photograph of a remote control device (and/or of an ECD controllable by the remote control device) to identify information about the remote control device (and/or about the ECD) has general applicability. For example, a web-based service can receive a digital photograph via the internet, can perform optical recognition on the digital photograph and use the results of the optical recognition to identify information in a database about the remote control device and/or an ECD controllable by the remote control device. The identified information can be returned to the user via the internet and the user can be billed for the service. Accordingly, the lookup function performed by function device 101 and database 112 need not be localized to a user's home. The storage of digital images of remote control devices in a codeset database has general applicability, and does the storage of extracted graphical information about remote control devices in the codeset database. Accordingly, various modifications, adaptations, and combinations of various features of the described embodiments can be practiced without departing from the scope of the invention as set forth in the claims.

What is claimed is:

1. A method comprising the steps of:
   (a) receiving a digital image of a particular control device;
   (b) maintaining a database of information, the database storing pieces of information about a plurality of remote control devices including: a shape of each of the plurality of remote control devices, a location of buttons on each of the plurality of remote control devices, a shape of the buttons on each of the plurality of remote control devices, and characters that appear on each of the plurality of remote control devices;
   (c) performing optical recognition on the digital image by analyzing a shape of the particular control device, analyzing a location of buttons on the particular control device, analyzing the shape of the buttons on the particular control device, and analyzing characters that appear on the particular control device; and
   (d) comparing the optical recognition results to said information in said database so that possibilities of which of the plurality of remote control devices the particular control device is can be narrowed down.

2. The method of claim 1, wherein (a) involves receiving the digital image via the internet, and wherein steps (a) through (d) are performed by a computer that is accessible via the internet.

3. A system comprising:
   a processor; and
   a processor-executable medium that stores a set of processor-executable instructions, the instructions causing the system to:
      perform optical recognition on a digital image of a particular remote control device to obtain information about the particular remote device control, the obtained information including a shape of the particular control device, a location of buttons on the particular control device, the shape of the buttons on the particular control device, and characters that appear on the particular control device; and
      interact with a database in which is stored pieces of information about a plurality of remote control devices including: a shape of each of the plurality of remote control devices, a location of buttons on each of the plurality of remote control devices, a shape of the buttons on each of the plurality of remote control devices, and characters that appear on each of the plurality of remote control devices, to determine, via use of the obtained information about the particular remote control device, which one or ones of the plurality of remote control devices that particular remote control device likely is.

4. The system of claim 3, wherein the database includes codeset information.

5. The system of claim 3, wherein the system is a web-based system, and wherein the web-based system can receive the digital image via the internet.

* * * * *